US012632099B2

(12) United States Patent
Ranjan et al.

(10) Patent No.: US 12,632,099 B2
(45) Date of Patent: May 19, 2026

(54) TECHNIQUES FOR ESTIMATING POWER CONSUMPTION OF A CHIPSET

(71) Applicant: QUALCOMM Incorporated, San Diego, CA (US)

(72) Inventors: Suyash Ranjan, San Diego, CA (US); Jittra Jootar, San Diego, CA (US); Shriram Gurumoorthy, Denver, CO (US); Saikat Das, Longmont, CO (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 17/520,388

(22) Filed: Nov. 5, 2021

(65) Prior Publication Data

US 2022/0147133 A1 May 12, 2022

Related U.S. Application Data

(60) Provisional application No. 63/111,504, filed on Nov. 9, 2020.

(51) Int. Cl.
*G06F 1/3234* (2019.01)
*G06F 1/3228* (2019.01)
*H04W 52/02* (2009.01)

(52) U.S. Cl.
CPC .......... *G06F 1/3243* (2013.01); *G06F 1/3228* (2013.01); *H04W 52/0261* (2013.01)

(58) Field of Classification Search
CPC ................ G06F 1/3243; G06F 1/3228; H04W 52/0261; Y02D 30/70
See application file for complete search history.

(56) References Cited

U.S. PATENT DOCUMENTS

| | | | |
|---|---|---|---|
| 10,206,134 B1 * | 2/2019 | Kocagoez ............. | H04W 24/08 |
| 2005/0044429 A1 * | 2/2005 | Gaskins ................ | G06F 1/3243 |
| | | | 713/300 |
| 2010/0050008 A1 * | 2/2010 | Allalouf .............. | G06F 11/3428 |
| | | | 713/340 |
| 2012/0059606 A1 * | 3/2012 | Ikari ................... | H04N 1/00068 |
| | | | 702/61 |

* cited by examiner

*Primary Examiner* — Andrew J Jung
*Assistant Examiner* — Cole Jiawei Wentzel
(74) *Attorney, Agent, or Firm* — Holland & Hart LLP

(57) ABSTRACT

Methods, systems, and devices for wireless communications are described. A device may identify modes from a set of modes in which at least one modem functional block of a set of modem functional blocks of a chipset operates during a portion of a time interval. Each modem functional block may include a set of units classified to have a power response that satisfies a power trend metric for at least one mode. The device may select power calculation equations from a set of power calculation equations based on the set of multiple modes, calculate an power consumption level for the chipset for the time interval based on the selected power calculation equations and a proportion of the time interval a respective multiple modem functional block of the set of modem functional blocks operates in a respective mode of the set of multiple modes.

22 Claims, 11 Drawing Sheets

Processor 210

Chipset 215

205-b 115-a 205-a 105-a 110-a 225-a

Modem unit
220-a

Modem unit
220-b 225-b

Modem unit
220-c

Modem unit
220-d

200

| | Functional block 1 | Functional block 2 | Functional block 3 | Functional block 4 | Functional block 5 | Functional block 6 |
|---|---|---|---|---|---|---|
| Mode 1 | Equation 1 | | | | | |
| Mode 2 | | | | | | |
| Mode 3 | | | Equation 15 | | | |
| Mode 4 | | | | | | Equation 24 |
| Mode 5 | | | | | | |
| Mode 6 | | | | | | |
| Mode 7 | | | | | | |
| Mode 8 | | | | | | |
| Mode 9 | | Equation 50 | | | | |
| Mode 10 | | | | | | |
| Mode 11 | | | | | | |
| Mode 12 | | | | Equation 70 | | |
| Mode 13 | | | | | | |
| Mode 14 | | | | | | |
| Mode 15 | | | | | | |
| Mode 16 | | | | | | |

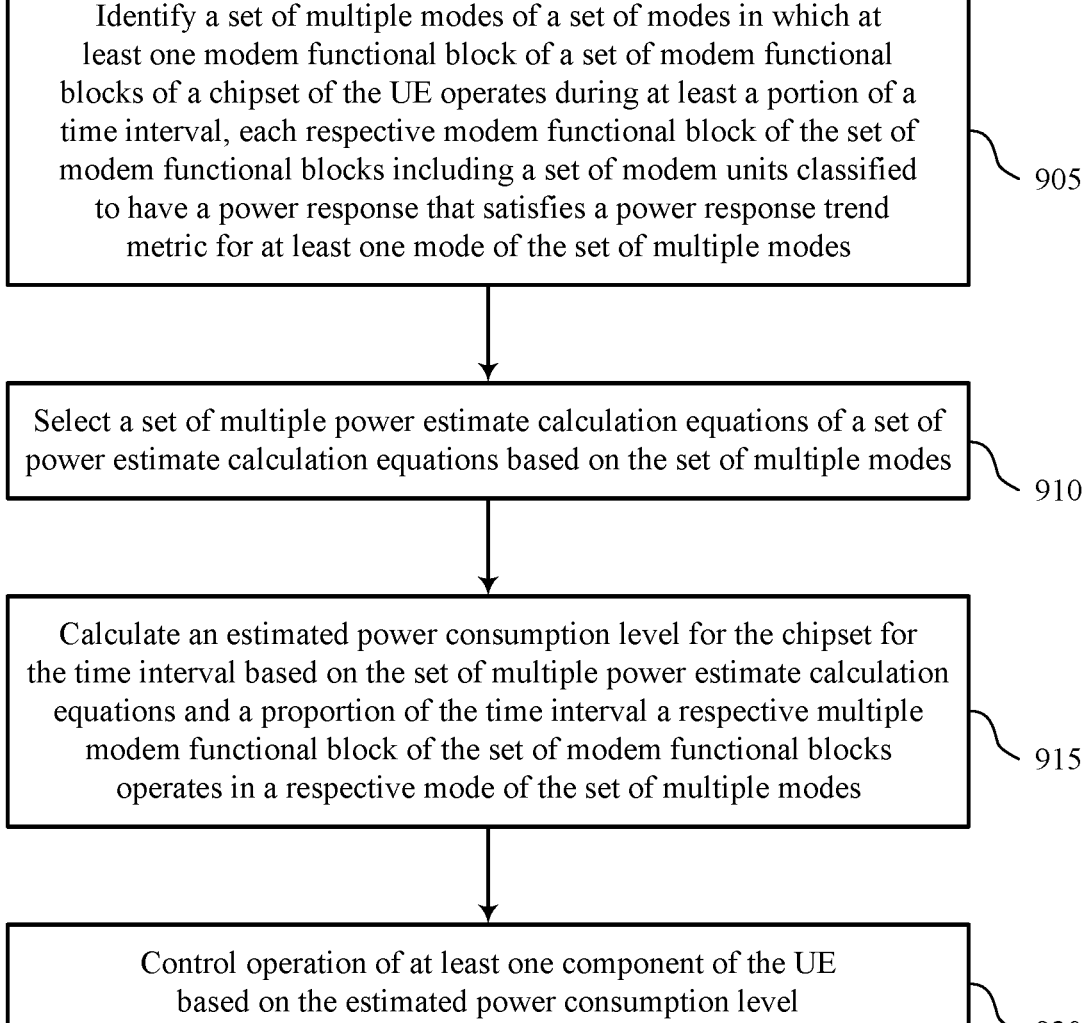

Identify a set of multiple modes of a set of modes in which at least one modem functional block of a set of modem functional blocks of a chipset of the UE operates during at least a portion of a time interval, each respective modem functional block of the set of modem functional blocks including a set of modem units classified to have a power response that satisfies a power response trend metric for at least one mode of the set of multiple modes

905

Select a set of multiple power estimate calculation equations of a set of power estimate calculation equations based on the set of multiple modes

910

Calculate an estimated power consumption level for the chipset for the time interval based on the set of multiple power estimate calculation equations and a proportion of the time interval a respective multiple modem functional block of the set of modem functional blocks operates in a respective mode of the set of multiple modes

915

Control operation of at least one component of the UE based on the estimated power consumption level

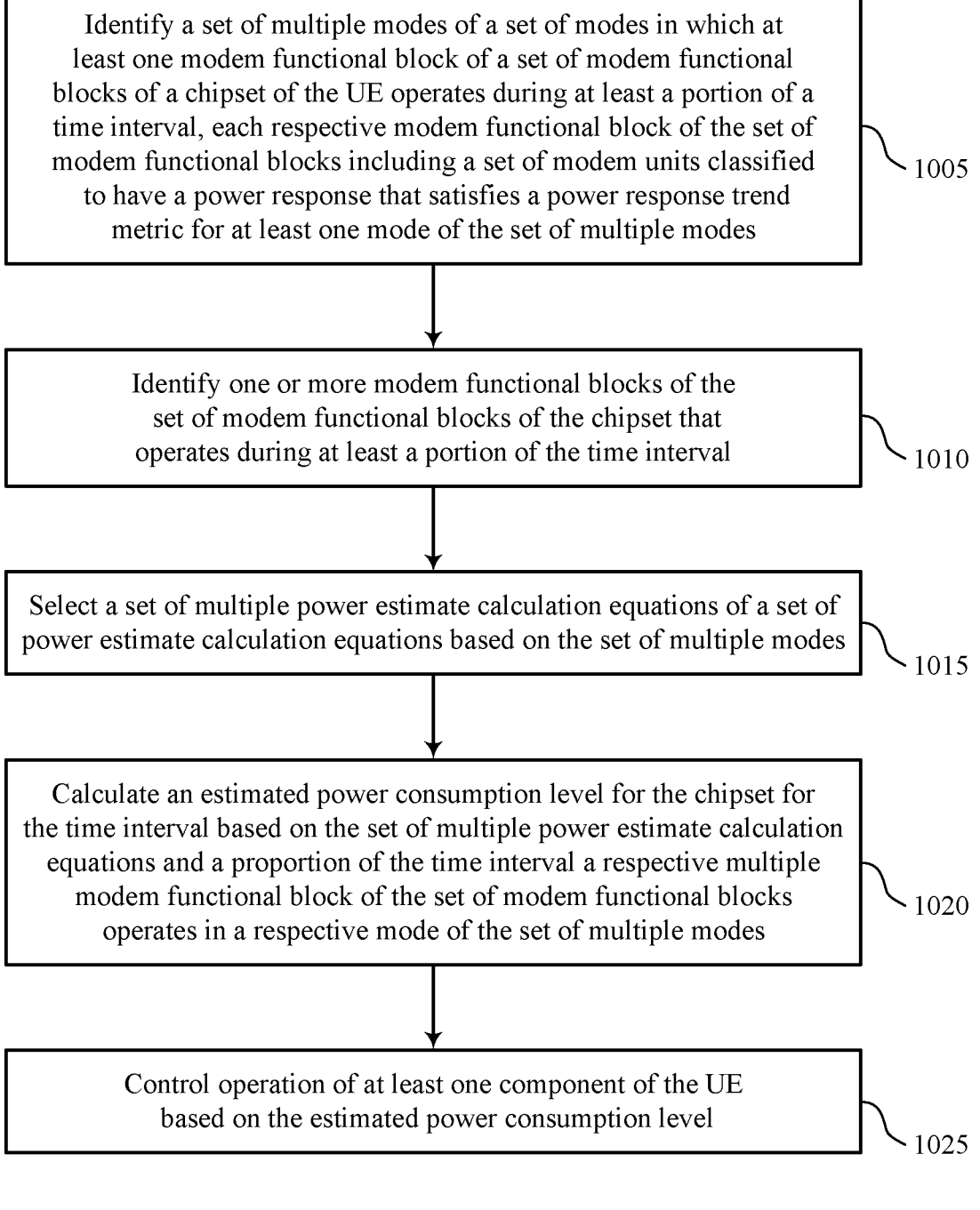

Identify a set of multiple modes of a set of modes in which at least one modem functional block of a set of modem functional blocks of a chipset of the UE operates during at least a portion of a time interval, each respective modem functional block of the set of modem functional blocks including a set of modem units classified to have a power response that satisfies a power response trend metric for at least one mode of the set of multiple modes

1005

Identify one or more modem functional blocks of the set of modem functional blocks of the chipset that operates during at least a portion of the time interval

1010

Select a set of multiple power estimate calculation equations of a set of power estimate calculation equations based on the set of multiple modes

1015

Calculate an estimated power consumption level for the chipset for the time interval based on the set of multiple power estimate calculation equations and a proportion of the time interval a respective multiple modem functional block of the set of modem functional blocks operates in a respective mode of the set of multiple modes

1020

Control operation of at least one component of the UE based on the estimated power consumption level

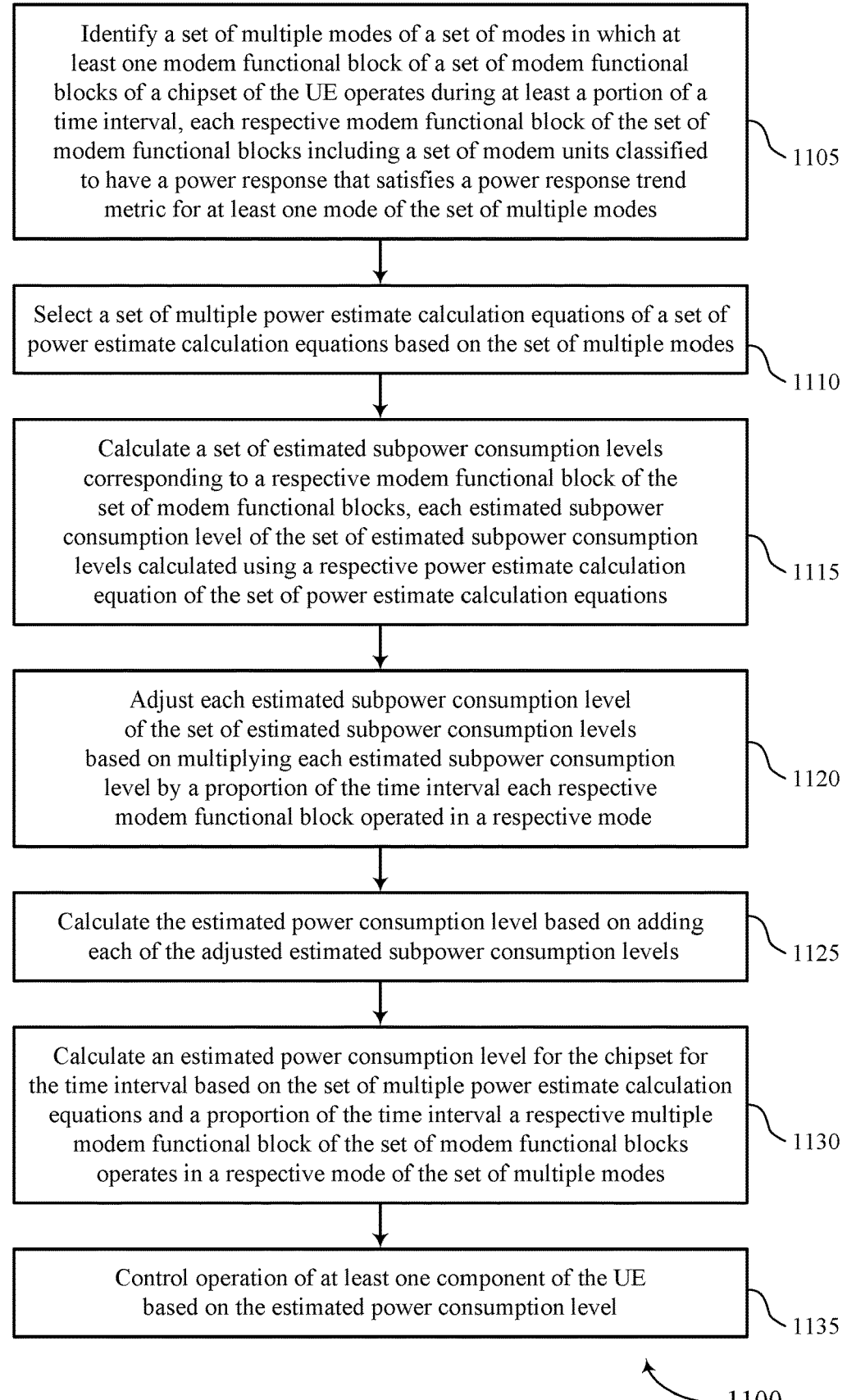

Identify a set of multiple modes of a set of modes in which at least one modem functional block of a set of modem functional blocks of a chipset of the UE operates during at least a portion of a time interval, each respective modem functional block of the set of modem functional blocks including a set of modem units classified to have a power response that satisfies a power response trend metric for at least one mode of the set of multiple modes

1105

Select a set of multiple power estimate calculation equations of a set of power estimate calculation equations based on the set of multiple modes

1110

Calculate a set of estimated subpower consumption levels corresponding to a respective modem functional block of the set of modem functional blocks, each estimated subpower consumption level of the set of estimated subpower consumption levels calculated using a respective power estimate calculation equation of the set of power estimate calculation equations

1115

Adjust each estimated subpower consumption level of the set of estimated subpower consumption levels based on multiplying each estimated subpower consumption level by a proportion of the time interval each respective modem functional block operated in a respective mode

1120

Calculate the estimated power consumption level based on adding each of the adjusted estimated subpower consumption levels

1125

Calculate an estimated power consumption level for the chipset for the time interval based on the set of multiple power estimate calculation equations and a proportion of the time interval a respective multiple modem functional block of the set of modem functional blocks operates in a respective mode of the set of multiple modes

1130

Control operation of at least one component of the UE based on the estimated power consumption level

TECHNIQUES FOR ESTIMATING POWER CONSUMPTION OF A CHIPSET

CROSS REFERENCE

The present Application for Patent claims the benefit of U.S. Provisional Patent Application No. 63/111,504 by RANJAN et al., entitled "TECHNIQUES FOR ESTIMATING POWER CONSUMPTION OF A CHIPSET," filed Nov. 9, 2020, assigned to the assignee hereof, and expressly incorporated by reference herein.

FIELD OF TECHNOLOGY

The following relates to wireless communications, including techniques for estimating power consumption of a chipset.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In conventional techniques, computer models may be used to determine the amount of power consumed by a device, such as a UE. These computer models may mimic the behavior of the device, where a large number of inputs may be required to run the computer model to generate the power consumption estimate. As such, the computer model may be complex and require a large amount of time (e.g., minutes, hours) and power to run the model. In some cases, it may be beneficial to configure a device to perform real-time power consumption estimates. However, conventional power estimation techniques may be deficient.

SUMMARY

The described techniques relate to improved methods, systems, devices, and apparatuses that support techniques for estimating power consumption of a chipset. Generally, the described techniques provide for a power estimation model that may be utilized by a device (e.g., UE, component of a UE) to determine real-time (or near real-time) power consumption estimates of the device. For example, a device (e.g., a UE) may include a chipset and a processor. A chipset may include one or more modem units that each perform a defined function as part of the chipset. For example, a modem or a power amplifier may be referred to as modem units of a chipset. Each modem unit of a chipset may be grouped into a functional block (e.g., a modem functional block) such that each modem unit within a functional block consumes a similar amount of power, for example, in response to at least one input variable. Further, a set of modes (e.g., generic modes) may be defined that may encompass actions that the device routinely performs (e.g., performing a call, downloaded data). For example, the modes may include a wideband CDMA (WCDMA) sleep mode, an LTE Partial sleep mode, a 5G Sub6 physical downlink control channel (PDCCH) mode, a 5G millimeter wave (mmW) data mode, etc. As such, a device may perform an action that requires a functional block to operate according to a mode. A power consumption equation may be associated with each mode and functional block combination. The device (e.g., the UE, the chipset) may be configured with the set of equations, and the mode and functional block combination associated with the equation so that the device may determine its power consumption using one or more equations of the set of equations.

In some case, the chipset may receive, such as from the processor, a command requesting calculation of an estimated power consumption level for a set of modem functional blocks of a chipset, or the chipset may otherwise determine to perform calculations of the estimation power consumption level. A device (e.g., chipset, UE) may identify a set of multiple modes of a set of modes in which at least one modem functional block of a set of modem functional blocks of the device (e.g., chipset, UE) operates during at least a portion of a time interval. Each respective modem functional block of the set of modem functional blocks may include a set of modem units classified to have a power response for at least one input parameter type that satisfies a power response trend metric for at least one mode of the set of multiple modes. The device may select a set of multiple power estimate calculation equations of a set of power estimate calculation equations based on the set of multiple modes, calculate an estimated power consumption level for the chipset for the time interval based on the set of multiple power estimate calculation equations and a proportion of the time interval a respective multiple modem functional block of the set of modem functional blocks operates in a respective mode of the set of multiple modes. In some cases, the device (e.g., chipset), or some other device (e.g., a processor of the UE) may control operation of at least one component of the UE based on the estimated power consumption level.

A method for wireless communications at a UE is described. The method may include identifying a set of multiple modes of a set of multiple modes in which at least one modem functional block of a set of multiple modem functional blocks of a chipset of the UE operates during at least a portion of a time interval, each respective modem functional block of the set of multiple modem functional blocks including a set of multiple modem units classified to have a power response that satisfies a power response trend metric for at least one mode of the set of multiple modes, selecting a set of multiple power estimate calculation equations of a set of multiple power estimate calculation equations based on the set of multiple modes, calculating an estimated power consumption level for the chipset for the time interval based on the set of multiple power estimate calculation equations and a proportion of the time interval a respective multiple modem functional block of the set of multiple modem functional blocks operates in a respective mode of the set of multiple modes, and controlling operation of at least one component of the UE based on the estimated power consumption level.

An apparatus for wireless communications at a UE is described. The apparatus may include a processor, memory in electronic communication with the processor, and instructions stored in the memory. The instructions may be executable by the processor to cause the apparatus to identify a set of multiple modes of a set of multiple modes in which at least one modem functional block of a set of multiple modem functional blocks of a chipset of the UE operates during at least a portion of a time interval, each respective modem functional block of the set of multiple modem functional blocks including a set of multiple modem units classified to have a power response that satisfies a power response trend metric for at least one mode of the set of multiple modes, select a set of multiple power estimate calculation equations of a set of multiple power estimate calculation equations based on the set of multiple modes, calculate an estimated power consumption level for the chipset for the time interval based on the set of multiple power estimate calculation equations and a proportion of the time interval a respective multiple modem functional block of the set of multiple modem functional blocks operates in a respective mode of the set of multiple modes, and control operation of at least one component of the UE based on the estimated power consumption level.

Another apparatus for wireless communications at a UE is described. The apparatus may include means for identifying a set of multiple modes of a set of multiple modes in which at least one modem functional block of a set of multiple modem functional blocks of a chipset of the UE operates during at least a portion of a time interval, each respective modem functional block of the set of multiple modem functional blocks including a set of multiple modem units classified to have a power response that satisfies a power response trend metric for at least one mode of the set of multiple modes, means for selecting a set of multiple power estimate calculation equations of a set of multiple power estimate calculation equations based on the set of multiple modes, means for calculating an estimated power consumption level for the chipset for the time interval based on the set of multiple power estimate calculation equations and a proportion of the time interval a respective multiple modem functional block of the set of multiple modem functional blocks operates in a respective mode of the set of multiple modes, and means for controlling operation of at least one component of the UE based on the estimated power consumption level.

A non-transitory computer-readable medium storing code for wireless communications at a UE is described. The code may include instructions executable by a processor to identify a set of multiple modes of a set of multiple modes in which at least one modem functional block of a set of multiple modem functional blocks of a chipset of the UE operates during at least a portion of a time interval, each respective modem functional block of the set of multiple modem functional blocks including a set of multiple modem units classified to have a power response that satisfies a power response trend metric for at least one mode of the set of multiple modes, select a set of multiple power estimate calculation equations of a set of multiple power estimate calculation equations based on the set of multiple modes, calculate an estimated power consumption level for the chipset for the time interval based on the set of multiple power estimate calculation equations and a proportion of the time interval a respective multiple modem functional block of the set of multiple modem functional blocks operates in a respective mode of the set of multiple modes, and control operation of at least one component of the UE based on the estimated power consumption level.

Some examples of the method, apparatuses, and non-transitory computer-readable medium described herein may further include operations, features, means, or instructions for identifying one or more modem functional blocks of the set of multiple modem functional blocks of the chipset that operates during at least the portion of the time interval.

Some examples of the method, apparatuses, and non-transitory computer-readable medium described herein may further include operations, features, means, or instructions for determining a first power estimate calculation equation from the set of multiple power estimate calculation equations to calculate a first estimated subpower consumption level for a first modem functional block of the set of multiple modem functional blocks based on the first modem functional block operating, during at least the portion of the time interval, in a first mode corresponding to the first power estimate calculation equation and calculating the first estimated subpower consumption level for the first modem functional block corresponding to the time interval based on the first power estimate calculation equation, where the estimated power consumption level may be calculated based on the first estimated subpower consumption level.

Some examples of the method, apparatuses, and non-transitory computer-readable medium described herein may further include operations, features, means, or instructions for determining a second power estimate calculation equation from the set of multiple power estimate calculation equations to calculate a second estimated subpower consumption level for a second modem functional block of the set of multiple modem functional blocks based on the second modem functional block operating, during at least the portion of the time interval, in the first mode corresponding to the second power estimate calculation equation and calculating the second estimated subpower consumption level for the second modem functional block corresponding to the time interval based on the second power estimate calculation equation, where the estimated power consumption level may be calculated based on the second estimated subpower consumption level.

Some examples of the method, apparatuses, and non-transitory computer-readable medium described herein may further include operations, features, means, or instructions for determining a second power estimate calculation equation from the set of multiple power estimate calculation equations to calculate a second estimated subpower consumption level for the first modem functional block of the set of multiple modem functional blocks based on the first modem functional block operating, during a second portion of the time interval, in a second mode corresponding to the second power estimate calculation equation and calculating the second estimated subpower consumption level for the first modem functional block during the second portion of the time interval based on the second power estimate calculation equation, where the estimated power consumption level may be calculated based on the second estimated subpower consumption level.

In some examples of the method, apparatuses, and non-transitory computer-readable medium described herein, selecting the set of multiple power estimate calculation equations may include operations, features, means, or instructions for selecting the set of multiple power estimate calculation equations of the set of multiple power estimate calculation equations based on each power estimate calculation equation of the selected set being associated with at least one modem functional block of the set of multiple modem functional blocks and the at least one mode of the set of multiple modes in which the modem functional block operated in during at least the portion of the time interval.

In some examples of the method, apparatuses, and non-transitory computer-readable medium described herein, calculating the estimated power consumption level may include operations, features, means, or instructions for calculating a set of multiple estimated subpower consumption levels corresponding to a respective modem functional block of the set of multiple modem functional blocks, each estimated subpower consumption level of the set of multiple estimated subpower consumption levels calculated using a respective power estimate calculation equation of the set of multiple power estimate calculation equations, adjusting each estimated subpower consumption level of the set of multiple estimated subpower consumption levels based on multiplying each estimated subpower consumption level by the proportion of the time interval each respective modem functional block operated in the respective mode, and calculating the estimated power consumption level based on adding the adjusted estimated subpower consumption levels.

In some examples of the method, apparatuses, and non-transitory computer-readable medium described herein, calculating the estimated power consumption level may include operations, features, means, or instructions for calculating the estimated power consumption level based on a weighted average of a set of multiple estimated subpower consumption levels calculated for a respective modem functional block of the set of multiple modem functional blocks that operated in a multiple modes during the time interval.

In some examples of the method, apparatuses, and non-transitory computer-readable medium described herein, the power response that satisfies the power response trend metric for at least one mode of the set of multiple modes may be associated with at least one input parameter type.

Some examples of the method, apparatuses, and non-transitory computer-readable medium described herein may further include operations, features, means, or instructions for determining a communication parameter value for the at least one input parameter type corresponding to a first power estimate calculation equation of the set of multiple power estimate calculation equations and calculating a first estimated subpower consumption level based on the first power estimate calculation equation and the communication parameter value for the at least one input parameter type, where the estimated power consumption level may be calculated based on the first estimated subpower consumption level.

In some examples of the method, apparatuses, and non-transitory computer-readable medium described herein, the communication parameter value may be a number of layers, or a bandwidth per layer, or a total allocated bandwidth, or a combination thereof.

In some examples of the method, apparatuses, and non-transitory computer-readable medium described herein, controlling the operation may include operations, features, means, or instructions for adjusting a power usage scheme corresponding to at least one modem functional block of the set of multiple modem functional blocks.

In some examples of the method, apparatuses, and non-transitory computer-readable medium described herein, controlling the operation may include operations, features, means, or instructions for adjusting a thermal mitigation scheme corresponding to at least one modem functional block of the set of multiple modem functional blocks.

In some examples of the method, apparatuses, and non-transitory computer-readable medium described herein, each modem unit of the set of multiple modem units may be a system on chip (SOC) unit, a dynamic random access memory (DRAM) unit, a power management integrated circuit (PMIC) unit, a modem subunit, a transceiver unit, a radio frequency (RF) unit, a power amplifier (PA) unit, or a low-noise amplifier (LNA) unit.

Some examples of the method, apparatuses, and non-transitory computer-readable medium described herein may further include operations, features, means, or instructions for receiving a command requesting calculation of the estimated power consumption level for the chipset.

In some examples of the method, apparatuses, and non-transitory computer-readable medium described herein, receiving the command requesting calculation of the estimated power consumption level may include operations, features, means, or instructions for receiving the command that indicates a duration of the time interval over which to calculate the estimated power consumption level for the set of multiple modem functional blocks of the chipset.

Some examples of the method, apparatuses, and non-transitory computer-readable medium described herein may further include operations, features, means, or instructions for calculating, for each period of the time interval, a subsequent estimated power consumption level for the set of multiple modem functional blocks for a corresponding period of the time interval.

BRIEF DESCRIPTION OF THE DRAWINGS

FIG. 3 illustrates an example of a power estimation table that supports techniques for estimating power consumption of a chipset in accordance with aspects of the present disclosure.

FIGS. 9 through 11 show flowcharts illustrating methods that support techniques for estimating power consumption of a chipset in accordance with aspects of the present disclosure.

DETAILED DESCRIPTION

Figure 1:
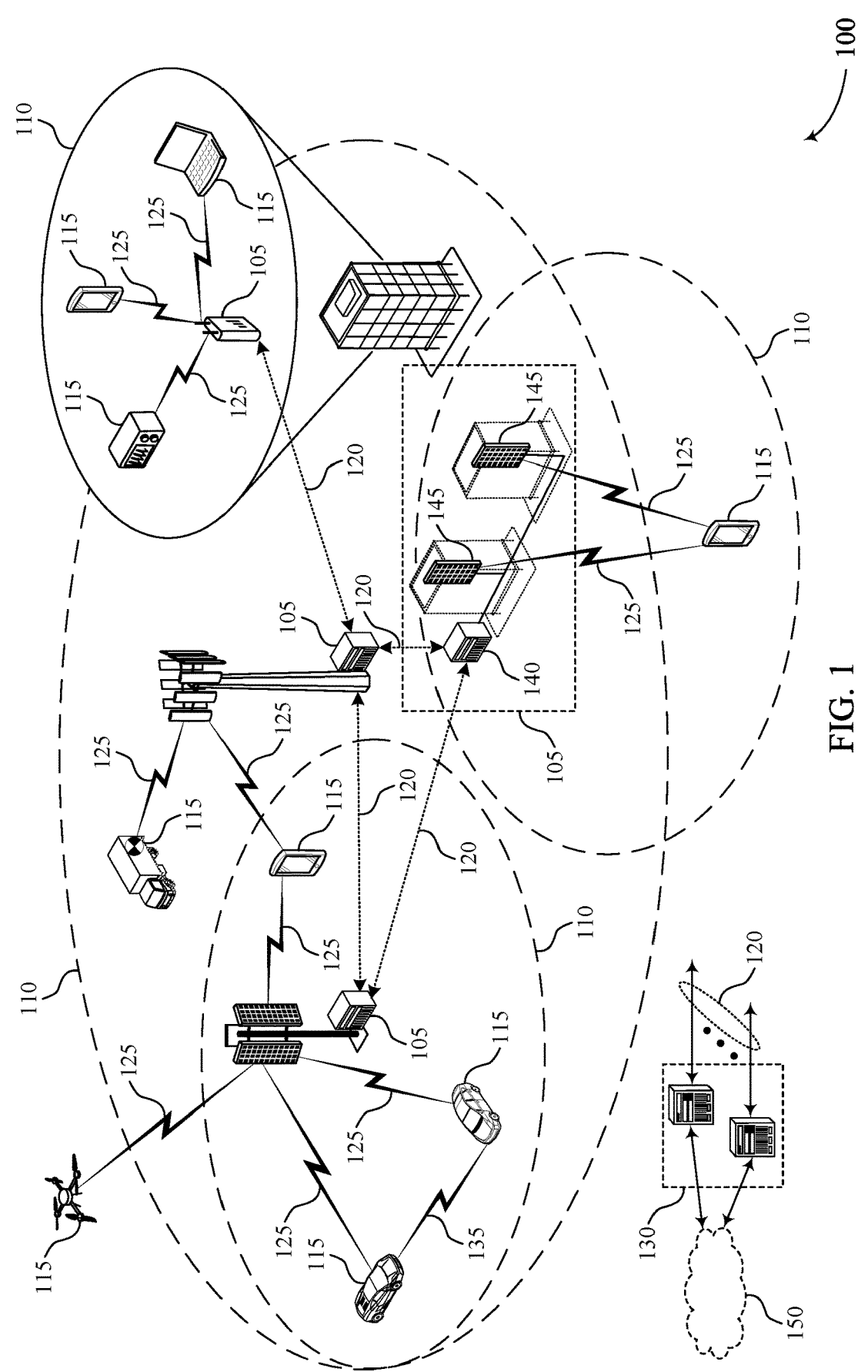
FIG. 1 illustrates an example of a system for wireless communications that supports techniques for estimating power consumption of a chipset in accordance with aspects of the present disclosure.

In conventional techniques, computer models may be used to determine the amount of power consumed by a device, such as a UE. For example, pre-silicon estimates may be performed on a device (e.g., a UE, a chipset) to determine the battery design and thermal design of the device. The pre-silicon estimates are not determined from the actual device but from a model run on a computer, server, or other heavy-duty computing machine, where the computer model may mimic the behavior of the device based on a set of inputs. The computer model may be complex and require a large amount of resources to run, such as time (e.g., minutes, hours) and energy resources. The computer model may generate an estimated amount of power/thermal consumption of the device, and then the post-silicon device may be manipulated to correspond with the computer generated, pre-silicon, estimates.

In some cases, it may be beneficial to configure a device (e.g., a post-silicon device) to perform real-time power consumption estimates in software of the device itself so that the device may use the real-time power consumption estimates to perform power consumption mitigation techniques. However, the conventional techniques (e.g., pre-silicon techniques) for determining power consumption may not be used in software of a post-silicon device because the computer model may require a large amount of time to run and as such, would not result in real-time estimates. Further, the computer model may require a large amount of power to run, and if implemented in the software of a device, may increase the overall power consumption of the device.

To configure a device with a power consumption estimation procedure, the device may be configured with a set of equations to use to calculate the power consumption of the device. For example, a device (e.g., a UE) may include a chipset and a processor. A chipset may include one or more modem units that each perform a defined function as part of the chipset. For example, a modem or a power amplifier may be referred to as a modem unit of a chipset. Each modem unit may be a hardware component, circuitry, or the like, configured to perform an operation related to wireless communication. Each modem unit of a chipset may be grouped into a functional block such that each modem unit within a functional block consumes a similar power response to one or more input variables. Further, a set of modes (e.g., generic modes) may be defined that may encompass actions the device routinely performs (e.g., performing a call, downloaded data). For example, the modes may include a WCDMA sleep mode, an LTE Partial sleep mode, a 5G Sub6 PDCCH mode, a 5G mmW data mode, and the like. A device may perform an action that requires a functional block or one or more modem units within a functional block to operate according to a mode. As such, a set of power consumption equations may be determined where each power consumption equation is associated with a mode and functional block combination. The device (e.g., the UE, the chipset, etc.) may be configured with the set of equations, and the mode and functional block combination associated with the equation.

A chipset, or some other processor of a device, may then use the appropriate equations to calculate the power consumption for a time interval to determine the total power consumption of the chipset during the time interval. For example, the chipset may determine that a first functional block of the chipset operated according to a first mode for a portion of a time interval. The chipset may use the equation associated with the first functional block and first mode combination to determine the amount of power the first functional block consumed during the time interval. In some cases, the chipset may determine the amount of power consumed by multiple functional blocks to determine the overall power consumption of the chipset during the time interval. A device (e.g., the UE), or a unit of the device (e.g., the chipset, the processor) may then perform an action based on the total power consumption to conserve the battery life of the device, to mitigate thermal effects of the device, or to log the power consumption of the device over time.

Particular aspects of the subject matter described herein may be implemented to realize one or more advantages. The described techniques may support improvements in power consumption of a device by implementing real-time power consumption estimation techniques that may be used by a device. Real-time power consumption estimation techniques may allow a device to perform mitigation techniques to conserve battery life and mitigate thermal effects of the device. As such, supported techniques may include improved network operations and, in some examples, may promote network efficiencies, among other benefits.

Aspects of the disclosure are initially described in the context of wireless communications systems. Aspects are then described with respect to a power estimation table and a process flow. Aspects of the disclosure are further illustrated by and described with reference to diagrams and flowcharts that relate to techniques for estimating power consumption of a chipset.

FIG. 1 illustrates an example of a wireless communications system 100 that supports techniques for estimating power consumption of a chipset in accordance with aspects of the present disclosure. The wireless communications system 100 may include one or more base stations 105, one or more UEs 115, and a core network 130. In some examples, the wireless communications system 100 may be a LTE network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same code-word) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a trans-mitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjust-ments associated with each of the antenna elements may be defined by a beamforming weight set associated with a particular orientation (e.g., with respect to the antenna array of the transmitting device or receiving device, or with respect to some other orientation).

In some cases, a device (e.g., a UE 115) may include a chipset and a processor. A chipset may include one or more modem units that each perform a defined function as part of the chipset. Each modem unit of a chipset may be grouped into a functional block (e.g., modem functional block) such that each modem unit within a functional block has a similar power response to one or more input variables (resulting in similar power trends, such as linear or quadratic power trends as values of the one or more input variables, alone or in combination, change). For example, the power response of modem units within a functional block based on input variation is similar, where the power in absolute numbers may not be similar. For example, two modem units, one with 10 milliWatt (mW) power and other with 100 mW power may be considered similar if they both become double when an input variable doubles. Further, a set of modes (e.g., sleep mode, partial sleep mode, talk mode, data mode, PDCCH mode, etc.) may be defined that may encompass actions the device routinely performs (e.g., performing a call, down-loaded data). A power consumption equation defined may be associated with each mode and functional block combina-tion so that the device may calculate the power consumption of each functional block under each mode using the equa-tion. As such, a set of power consumption equations may be defined. The device (e.g., the UE 115, the chipset) may be configured with the set of equations, and the mode and functional block combination each equation is associated with.

In some cases, the chipset may receive, such as from the processor, a command requesting calculation of an estimated power consumption level for a set of modem functional blocks of a chipset, or the chipset may otherwise perform calculations of the estimated power consumption level. A device (e.g., chipset, UE 115) may identify a set of multiple modes of a set of modes in which at least one modem functional block of a set of modem functional blocks of a chipset of a UE 115 operates during at least a portion of a time interval. Each respective modem functional block of the set of modem functional blocks may include a set of modem units classified to have a power response that satisfies a power response trend metric for at least one mode of the set of multiple modes. The device may select a set of multiple power estimate calculation equations of a set of power estimate calculation equations based on the set of multiple modes, calculate an estimated power consumption level for the chipset for the time interval based on the set of multiple power estimate calculation equations and a propor-tion of the time interval a respective multiple modem functional block of the set of modem functional blocks operates in a respective mode of the set of multiple modes. In some case, the device (e.g., chipset), or some other device (e.g., a processor of the UE 115) may control operation of at least one component of the UE based on the estimated power consumption level.

Figure 2:
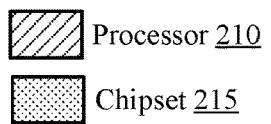
FIG. 2 illustrates an example of a system for wireless communications that supports techniques for estimating power consumption of a chipset in accordance with aspects of the present disclosure.

FIG. 2 illustrates an example of a wireless communica-tions system 200 that supports techniques for estimating power consumption of a chipset in accordance with aspects of the present disclosure. The wireless communications system 200 may include base station 105-a and UE 115-a, which may be examples of a base station 105 and a UE 115 as described with reference to FIG. 1. Base station 105-a may serve a geographic coverage area 110-a. In some cases, UE 115-a or a chipset of UE 115-a may implement a power consumption estimation procedure to determine the power consumption of UE 115-a. Additionally, or alternatively, other wireless devices, such as base station 105-a, may implement the power consumption estimation procedure as described herein.

In some cases, devices, such as a UE 115 or a component of a UE 115 such as a chipset, may be tested in a virtual environment to determine the behavior of the device, such as the amount of power the device consumes under certain parameters. For example, a device may be modeled in a virtual environment (via a computer model) to determine the behavior of the device, without the device, which may be used to design and/or select one or more components of the device, such as a battery of appropriate size. Such testing may be referred to as pre-silicon testing and due to the virtual nature of the testing, may be static.

Static pre-silicon power estimation techniques may use a limited set of parameters (e.g., use cases) that may allow for the selection of the appropriate battery size of the device, and/or selection of the thermal design of the platform of the device. In some cases, the pre-silicon power estimation techniques may be used to optimize hardware, software, or both of the device for enhanced device performance (e.g., increased power and user experience). In some cases, the pre-silicon power estimation techniques may be used for key performance indicator (KPI) analysis, such as to determine power consumption of the device, or days-of-use (DoU) of the device. In some cases, the pre-silicon power estimation techniques may be used for correlation and debugging techniques on the post-silicon device (e.g., the actual device). For example, the pre-silicon estimates may be used to debug the post-silicon device so that the battery design and thermal design of the pre-silicon device still apply to the post-silicon device.

The computer model may mimic the behavior of a device. As such, the computer model may be complex and require a significant amount of resources to run, such as time (e.g., minutes, hours, etc.) and energy resources. In some cases, it may be beneficial to configure a device (e.g., a post-silicon device) to perform real-time power consumption estimates in the software of the device so that the device may use the power consumption estimates and act, as needed, to mitigate power consumption of the device to conserve battery power and/or to mitigate thermal effects. For example, a device, such as UE 115-*a*, may perform one or more functions (e.g., downloading data, streaming, gaming, etc.) that may impact one or more operating parameters of the device (e.g., drain the battery of the device, increase the temperature of the device, etc.). In one example, a device, such as UE 115-*a* may communicate with a base station 105, such as base station 105-*a* in a wireless communications system 200. UE 115-*a* and base station 105-*a* may communicate over one or more communication links 205. For example, base station 105-*a* may transmit signals to UE 115-*a* via communication link 205-*b* (e.g., a downlink communication link 205) and UE 115-*a* may transmit signals to base station 105-*b* via communication link 205-*b* (e.g., an uplink communication link 205). In such cases, it may be beneficial for the device to determine, in real-time (or near real-time) the power consumption of the device (or of one or more components of the device) so that the device may use the determined power consumption information to change one or more operating parameters of the device (or one or more operating parameters of one or more components of the device) to mitigate battery usage and/or mitigate rising temperatures of the device.

However, the pre-silicon techniques for determining power consumption may not be implemented in software of a post-silicon device because the pre-silicon computer model may use a large amount of time to run and, as such, would not result in real-time estimates. Further, the equipment (e.g., computer, server, etc.) being used to run the pre-silicon computer model may use a separate power source to run the model, and thus may not impact the power consumption estimates of the pre-silicon device. However, if the model were implemented in software of the post-silicon device to determine the power consumption of the device, the device would have to use its own power to perform the calculation. As such, running the model would add to the overall power consumption that the device is attempting to calculate, which would lead to a complex or inaccurate power consumption estimate.

To determine the amount of power a device, such as a post-silicon device (e.g., UE 115-*a*, base station 105-*a*), consumes, the device may be configured with a simplified model. The simplified model may be based on the components (e.g., chipset, processor, etc.) the device includes and the modes in which the device may operate. For example, a device, such as UE 115-*a*, may include a processor 210 and a chipset 215. A chipset 215 may include one or more modem units 220 that each perform a defined function as part of the chipset 215, where each modem unit 220 may be connected to or receive commands from the processor 210 of the chipset 215. A modem unit 220 may be connected to one or more other modem unit 220. For example, a modem, system on chip (SOC), dynamic random access memory (DRAM), power management integrated circuit (PMIC), an interconnect (e.g., an interconnect between its SDX series chips (such as, modem chips) and SDR series chips (such as, RF chips), SDX-SDR interconnect, etc.), a digital component (e.g., wireless transceiver modem subsystem (WMSS)), radio frequency (RF) component, a power amplifier, a low noise amplifier (LNA), etc., may each be referred to as a modem unit 220 of a chipset 215. Further, a device, or one or more modem units 220 of a device, may operate according to a mode of operation to perform an action of the device. For example, the device may perform a characteristic action (e.g., place an outgoing call, receive a text message, download data, etc.) which may require one or more modem units 220 of the device to operate according to a mode of operation to perform the characteristic action.

To determine the amount of power a device, such as a post-silicon device (e.g., UE 115-*a*, base station 105-*a*), consumes, the device may determine the amount of power each modem unit 220 of the device consumes, which may be based on the mode in which the modem unit 220 is operating. However, determining the amount of power each modem unit 220 uses under each possible action the device may perform may lead to a complex calculation.

To mitigate the complexity of the power estimation procedure (e.g., the post-silicon power estimation procedure) and to ensure real-time power estimation, modem units 220 may be grouped into functional block 225 (e.g., modem functional blocks), or device actions may be grouped into modes (e.g., generic modes), or both so as to lower the quantity of variables to consider for the power estimation procedure. For example, each modem unit 220 of a chipset 215 may be grouped into a functional block 225 such that each modem unit 220 within a functional block 225 has a similar (or same) power response (e.g., power consumption trend) to one or more input variables (e.g., bandwidth).

For example, two modem units may be determined to have similar power responses if the power consumed by each modem unit varies in a similar manner in response to changes in values of the same type of input parameter or a same set of input parameters. For example, the amount of power utilized by modem units that changes linearly, quadratically, via another polynomial equation, or by another equation determined using interpolation, for at least a same input variable (e.g., bandwidth, number of layers), are classified in a same functional block. For example, modem units 220 whose power consumption varies linearly, quadratically, or by another equation determined using interpolation, when at least one type of parameter changes, may be classified in a same functional block. In some cases, modem units 220-*a* and 220-*b* may have similar power responses to an input variable as each other while modem units 220-*c* and 220-*d* may have similar power responses to the input variable as each other. For example, the amount of power consumed by modem units 220-*a* and 220-*b* may each change linearly (or quadratically or by another equation, such as one determined using interpolation) as a value related to a change of at least one same input variable. In an example, the amount of power consumed by modem units 220-*a* and 220-*b* may each change linearly (or quadratically or by another equation) in accordance with changes to a receive bandwidth being monitored. Increasing the bandwidth being monitored may result in a corresponding linear increase in power consumption, and decreasing the bandwidth being monitored may result in a corresponding linear decrease in power consumption. In some cases, modem units 220-*a* and 220-*b* may be classified within a same functional block when having a similar power response for certain ranges of values of at least one type of input variable.

As such, modem units 220-a and 220-b may be grouped into functional block 225-a and modem units 220-c and 220-d may be grouped into functional block 225-b. In some cases, the number of functional blocks 225 that the modem units 220 are divided into may be determined to provide a relatively accurate power estimation while mitigating computational complexity. For example, increasing the number of functional blocks 225 may increase accuracy but may also increase complexity of the calculation.

In some implementations, a set of modes (e.g., generic modes) may be defined that may encompass actions that the device routinely performs. The modes be based on the wireless communications type (e.g., WCDMA, LTE, 5G Sub6, 5G mmW, etc.) and an action (e.g., sleep, partial sleep, PDCCH, data, etc.) performed in the wireless communication type. For example, the set of modes may include a WCDMA sleep mode, an LTE partial sleep mode, a 5G Sub6 PDCCH mode, a 5G mmW data mode, etc. Any action the device may perform, such as downloading data, may be covered by one of the defined modes. In some cases, the number of modes that are defined may be optimally determined to provide an accurate power estimation while mitigating complexity. For example, increasing the number of defined modes may increase accuracy but may also increase the complexity of the calculation.

To determine the amount of power each functional block 225 consumes while operating under each defined mode, the device (e.g., UE 115-a, base station 105-a, a chipset 215, and processor 210) may be configured with a set of equations usable to calculate the power consumption of the device. Each equation of the set of equations may be mode and functional block 225 specific. Upon being configured with the set of equations, the device may determine or identify the functional blocks 225 that operated during a time interval, and the mode in which each functional block 225 operated. The device may then use the equations corresponding to the determined functional block 225 and mode combinations to calculate a sum of the power consumption of each functional block 225 for a time interval to determine the total power consumption of the chipset 215 during the time interval. The chipset 215 may then perform an action based on the total power consumption to conserve the battery life of a device associated with the chipset 215 (e.g., UE 115-a) to mitigate thermal effects of the device, to log the power consumption of the chipset over time, and the like.

In some cases, the real-time power estimation techniques as described herein may be implemented in software of a device and may be referred to as on-chip power estimation. Such techniques may be dynamic such that the techniques may occur frequently (e.g., on the order of seconds) and/or may be triggered by another device such as another device of the UE 115-a (e.g., a processor, baseband model, etc.). As the real-time power estimation is a simplified (e.g., optimized), as compared to the pre-silicon power estimation model, the real-time power estimation techniques may be computed on the order of micro-seconds (e.g., in real-time) and may not add, or minimally add, to the overall power consumption of the device performing the techniques. Further, the real-time power estimation techniques described herein may allow a device to determine the power consumption of the device under any use case (e.g., any real-world use case), as opposed to a few lab dashboard (or DoU, where DoU may refer to a metric used by original equipment manufacturer (OEMs) to measure how many days a battery will last assuming a certain set of use cases with different time weights for each of them) scenarios used in the pre-silicon power estimation models.

FIG. 3 illustrates an example of a power estimation table 300 that supports techniques for estimating power consumption of a chipset in accordance with aspects of the present disclosure. The power estimation table 300 may illustrate a set of equations a device may be configured with to determine the power consumption of the device. The power estimation table 300 may be implemented in a base station or a UE, which may be examples of a base station 105 and a UE 115 as described with reference to FIGS. 1 and 2. For example, a UE may implement a power consumption estimation procedure by using the power estimation table 300 to determine the power consumption of the UE. Additionally, or alternatively, other wireless devices, such as a base station, may implement the power consumption estimation procedure as described herein.

As described with reference to FIG. 2, modem units of a chipset of a device may be classified into functional blocks based on the power trend of each modem unit such that each modem unit included in a functional block has a similar power response (e.g., power trend) in response to the same one or more input parameters and may be represented by a single power equation. In some cases, more than one input parameter may be used to determine the power responses. For example, functional block 1 may include the SoC, DRAM, and PMIC of a chipset. Functional block 2 may include the modem of the chipset. Functional block 3 may include an interconnect of the chipset (e.g., an interconnect between its SDX series chips (such as, modem chips) and SDR series chips (such as, RF chips), SDX-SDR interconnect). Functional block 4 may include a digital component of the chipset (e.g., WMSS, digital component of the SDR). Functional block 5 may include a power amplifier and an LNA of the chipset.

Further, each action that the device may perform may be simplified into a set of operational modes. For example, 16 modes may be defined that may encompass each action the device may perform and may be based on a wireless communications system that the device is operating in. The actions the device may perform may be slotted into a mode based on the power trend of the actions in response to input parameters such that each action within a mode has a similar power response (e.g., power trend such as a linear, quadratic, other polynomial, or other equation determined using interpolation as a value of at least one input parameter changes) in response to the same one or more input parameters and may be represented by a single power equation. For example, modes 1 through 4 may be defined as WCDMA modes, modes 5 through 8 may be defined as LTE modes, modes 9 through 12 may be defined as 5G Sub6 modes, and modes 13 through 16 may be defined as 5G mmW modes. The modes within a wireless communications system subset may then be based on a broad action that the device may perform. For example, modes 1, 5, 9, and 13 may be sleep modes, which may encompass any action associated with the device being in a sleep mode, or any action the device may perform while in a sleep mode. Modes 22, 6, 10, and 14 may be partial sleep modes, which may encompass any action associated with the device being in a partial sleep mode, or any action the device may perform while in a partial sleep mode. A partial sleep mode may be a mode where processing requirements are similar to a sleep mode, but the sleep to wake up window is shorter than the sleep mode. As such, additional circuitry may remain on during a partial sleep mode as compared to the sleep mode, to enable faster wake up. Modes 3, 7, 11, and 15 may be PDCCH modes, which may encompass any action associated with the device receiving a PDCCH that does not include a data grant. As such, modes 3, 7, 11, and 15 may include processing received PDCCHs (without data grants), such that no data is processed in modes 3, 7, 11, and 15. Modes 4, 8, 12, and 16 may be data modes, which may encompass any action associated with the device handling (e.g., receiving, transmitting, configuring) data. As such, mode 1 may be a wideband CDM (WCDM) sleep mode, for example. In some implementations, post-silicon lab measurements and logs (e.g., post-silicon measurements and logs for modem use cases on a chipset or modem unit) may be used to determine the real-time power estimation techniques as described herein. For example, post-silicon lab measurements may be used to group modem units into functional blocks and/or to determine the modes (e.g., sleep mode, partial sleep mode, talk mode, data mode, PDCCH mode, etc.) that encompass actions the device may perform.

To determine the amount of power the device (e.g., a UE, a base station) consumes in a time interval, the device may determine the amount of power each functional block consumes in the time interval, where the amount of power each functional block consumes in the time interval may be based on the mode(s) the functional block operates in during the time interval. To determine the amount of power each functional block consumes based on a mode, an equation may be developed for each combination (e.g., {sub block1, . . . sub blockN}×{mode1, . . . modeN}) of mode and functional block. For example, an equation may be developed for sub block 1 (e.g., functional block)×mode 1, and the like. Equation generation for a functional block for a given mode may be performed using measurements (e.g., lab dashboard measurements) of that mode with varying input conditions and determining an equation, such as a linear or quadratic equation, using interpolation techniques. For example, a model may be run for each combination of mode and functional block to determine a power consumption equation (e.g., a linear or quadratic equation) associated with each mode and functional block combination. In some cases, the model may be run for each combination of mode and functional block using at least one input parameter, where the at least one input parameter is chosen based on the mode and functional block combination. As such, groups of modem units may be classified in respective functional blocks, and an equation is determined for each functional block for estimating power usage. The power response trend metric may be a linear, quadratic, cubic, exponential, or other equation which may be determined using interpolation, or the like, such that the power consumption of the modem units within a functional block may change in a similar way as the at least one input variable changes. In some cases, the input parameter used to determine the equation may be the same input parameter used to classify modem units into functional blocks. As such, different combinations may be associated with different input parameters. For example, the input parameter for classifying modem units into a functional block (via analysis) for the combination of functional block 1 (e.g., SOC, DRAM, and PMIC) and mode 7 (e.g., LTE-PDCCH) may be a number of receive layer multiplied by the bandwidth per layer (e.g., Total_DL_BW*Layers). As the key input parameter per each function depends on the combination, the input parameter for each combination may be different. In some cases, some combinations may share the same input parameters. Additional input parameters may include voltage (e.g., rail voltage), throughput (e.g., maximum uplink and/or downlink throughput for LTE, NR, etc.), bandwidth (e.g., total downlink bandwidth), total number of layers, reception and/or transmission of the device (e.g., 4RX enabled on any carrier, receiver antenna history, downlink receiver count, uplink transmitter count, no reception and no transmission count, reception and transmission count, downlink reception of a PDCCH count, TDD uplink no transmitter count), mode duration of the device (e.g., no sleep duration, partial sleep duration, deep sleep duration, etc.), and the like.

The power consumption of each functional block may be measured while operating each mode at different values of the input parameter (e.g., bandwidth, download size, number of layers). The power consumption of each functional block while operating each mode may be determined based on lab measurements, such that the power consumption of each functional block while operating under each mode may be determined in a lab environment, statically. For example, to determine the equation (e.g., equation 1) for functional block 1 and mode 1, the power consumption of functional block 1 may be measured while functional block 1 operated in mode 1 at multiple different values of the input parameter, such as 1 megabit per second (mbps), 10 mbps, 100 mbps, 500 mbps in the case that the input parameter is download size. In some cases, the equation associated with some functional block and mode combinations may not be based on input parameters. Rather, some modes may be associated with a constant power level, such as some sleep modes (e.g., LTE-sleep mode, 5G mmW-sleep mode) and partial sleep modes where the power consumption during these modes may be constant (or near constant) and independent of an input parameter value. As such, the power consumption of a functional block while operating in such mode, may be a constant characterized value, where the constant characterized value may change based on the functional block. Then, the power consumption measurements (y) may be plotted against the different input values of the parameter (x) to determine a power consumption equation associated with functional block 1 and the mode 1 based on the input parameter. The plot may be fitted first to a linear equation. If the linear equation does not meet an accuracy threshold level, then a quadratic equation may be fitted to the plot. For example, the power consumption measurements and input parameter values of the combination of functional block 1 and mode 7, as described above, may be Power=0.2289 $(\text{Total}_{DL_{BW}}*\text{Layers})+13.576$. Such equation generation techniques may be performed for each combination of functional block and each mode. For example, in the case of 5 functional blocks and 16 modes, as depicted in FIG. 3, the equation generation techniques may determine 96 equations such as equation 1 associated with functional block 1 and mode 1, equation 15 associated with functional block 3 and mode 3, equation 24 associated with functional block 6 and mode 4, equation 50 associated with functional block 2 and mode 9, and equation 70 associated with functional block 4 and mode 12.

The device (e.g., the UE, the chipset) may be configured with the set of equations and constant values (in software of the device), the mode and functional block combination each equation and constant value is associated with, and the input parameter each equation is associated with. The device may be configured with the set of equations via a mathematical function via a look up table. In some cases, the device may be configured with or receive an indication of a calculation periodicity that may define how often the device calculates the power consumption of the device. The calculation periodicity may be defined as a quantity of time, such as by a quantity of milliseconds, seconds, minutes, slots, symbols, subframes, etc. Between calculations, the device may be configured to monitor the activity of the functional block subsets of the device during the time interval. A chipset may then determine the functional blocks 225 that operate during the time interval, the modes each functional block 225 operated in, and the proportion of time each combination (mode and functional block 225 combination) was used within the time interval. For example, the device (e.g., the UE, or the chipset, a modem unit) may be configured with a calculation periodicity of 400 ms. Within the 400 ms, the chipset may determine that functional blocks 1, 3, and 6 operated according to mode 1 for 100 ms, functional blocks 1, 2, and 5 operated according to mode 10 for 200 ms, and functional block 5 operated according to mode 16 for 100 ms.

The chipset may use the mathematical function or lookup table to determine appropriate equations based on the activity of the functional blocks in the 400 ms. For example, the chipset may determine that equations 1, 3, 6, 55, 56, 59, and 95 apply for the example 400 ms. The chipset may also determine the parameter associated with each equation. At the end of the time interval and at a calculation period, the chipset may perform the calculations using the determined equations, where each output may equal the amount of power consumed by a functional block while operating under a mode as if the functional block operated in the mode for the total interval. As such, the device may adjust the outputs by multiplying each output by the percentage (e.g., proportion) of the time interval that the functional block actually operated in that mode. For example, the output of equation 1 may be multiplied by 25% because the first functional block operated in the first mode for 25% of the 400 ms time interval. The chipset may calculate the estimated power consumption level for the chipset consumed for the time interval (e.g., total estimated power the chipset consumed during the time interval) between the calculation periodicities by adding the adjusted total estimated powers for each functional block.

In some cases, throughout the time interval, the chipset (e.g., software of the chipset) may determine which functional blocks are operating under which modes and the software may determine the equations associated with the combinations of modes and functional blocks that occur in the time interval and/or determine the input parameters associated with each combination. In real-time, the chipset may keep a log for each functional block that includes the input parameter and mode the functional block is in. For example, (continuing with the above example), as functional blocks become activated and operate under mode 1, the chipset may log, for each functional block, the input parameter associated with the combination of the functional block and mode, the mode the functional block operated it, the equation associated with the combination of the functional block and mode, or the amount of time each functional block operated in the mode, or a combination thereof. The chipset may configure a histogram of the logged input parameters and generic modes for each functional block. In some cases, the chipset may configure the histogram as the log, such that the histogram is configured in real-time. At the calculation periodicity (at the end of the 400 ms), the chipset may evaluate the histogram to determine the corresponding equations and calculate the total estimated power per functional block, where the total estimated power may be a weighted average of modes and input parameters in the histogram. As a result, the chipset determined the amount of power a functional block consumed during the time interval between calculation periodicities based on the one or more modes the functional block operated in and based on the duration of time the functional block operated in each of the one or more modes. The chipset may calculate the total power the chipset consumed during the time interval between the calculation periodicities by adding the total estimated power for each functional block.

In some cases, the real-time power estimation techniques as described herein may be implemented as a power estimator tool in one or more devices (e.g., a UE), or components of a device (e.g., chipset, modem). For example, a power estimator tool may be implemented in a modem unit or component (e.g., chipset, processor) of a device, where the power estimator tool may be fully implemented and enabled in software binary of a device. The power estimator tool may not cause any additional power consumption of the device and may not impact (e.g., negatively impact) the performance of the device. In some implementations, the power estimator tool may be used to estimate the peak and average current at a baseband of the device (e.g., LTE/NR modem subsystem (MSS) power, modem (MDM) interconnect power (e.g., power of an interconnect between SDX series chips (such as modem chips) and SDR chips (such as RF chips)), SOC/DDR/PMIC power), peak and average current wireless transmitter receiver/transceiver (WTR) of the device (e.g., RF interconnect power, WMSS power, mixed signal IP (MSIP) power, RF power, etc.), peak and average current at mmW RF chip of the device (e.g., used mmW RF chip power, unused mmW RF chip power, etc.), peak and average current at a mmW RF/intermediate frequency (IF) chip of the device (e.g., NR mmW RF interconnect Power, NR mmW WMSS power, NR mmW RF MSIP power, etc.). In some examples, a weighted average of power of each of the mode states may be determined during the time interval. In some examples, a peak power in a given configuration may be determined, which may be calculated assuming that only the data generic mode is occurring (e.g., the data mode (the highest power generic mode) has 100% of the weight in the weighted average). In some cases, the power estimator tool may be use while the device is in a connected mode, and may be use in different types of wireless communications systems such as LTE, NR 5G, ENDC, WCDM, etc.

Figure 4:
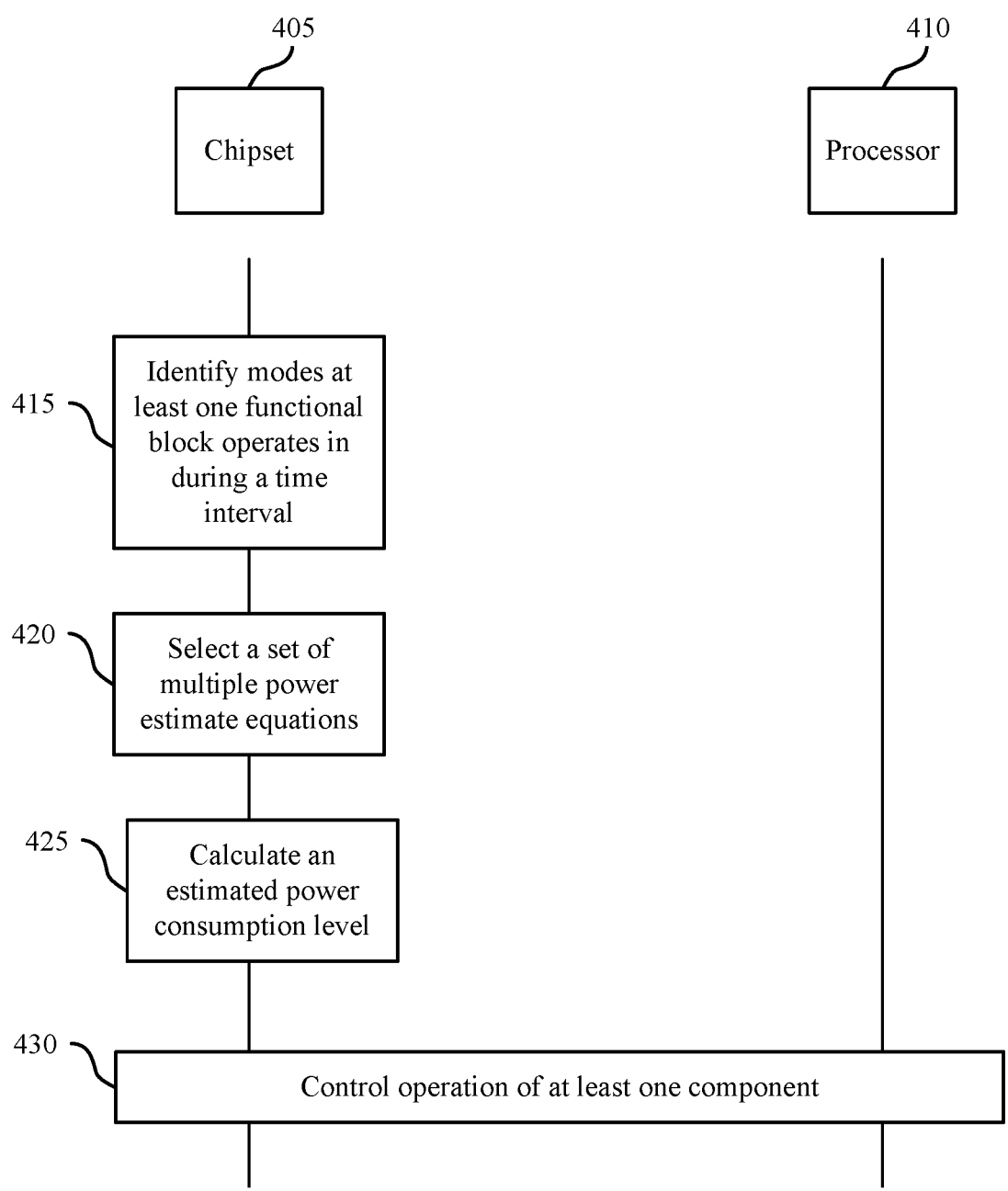
FIG. 4 illustrates an example of a process flow that supports techniques for estimating power consumption of a chipset in accordance with aspects of the present disclosure.

FIG. 4 illustrates an example of a process flow 400 that supports techniques for estimating power consumption of a chipset in accordance with aspects of the present disclosure. The process flow 400 may illustrate an example power estimation procedure that may be performed by a device (e.g., post-silicon device). For example, a device, such as a UE or a base station or a component of a UE or base station, such as the base station and the UE as described with reference to FIGS. 1 through 3, may be configured with power estimation techniques. The power estimation techniques may be implemented real-time by the device to determine the overall power consumption of the device. Alternative examples of the following may be implemented, where some steps are performed in a different order than described or are not performed at all. In some cases, steps may include additional features not mentioned below, or further steps may be added.

The techniques described herein may result in simplified equations (e.g., linear, quadratic equations, or other higher order polynomial equations) or simple lookup table based on few key input parameters for functional blocks, such that the calculations and/or lookup table are not computing or power intensive. The described techniques may slot complex modem scenarios (e.g., real-world modem scenarios) into simplified scenarios which may be represented by simplified equations and weigh them together. As such, complex scenarios may be slotted into simplified models using linear or quadratic non-compute, non-power intensive functions.

In some case, the chipset 405 may receive, such as from the processor 410 or base station, a command requesting calculation of an estimated power consumption level for a set of modem functional blocks (e.g., modem functional block) of a chipset, or the chipset may otherwise determine to perform calculations of the estimation power consumption level. In some cases, the chipset 405 may be configured to perform the power estimation techniques periodically, semi-persistently, or periodically. In some cases, the chipset 405 may receive a command that indicates a duration of the time interval over which to calculate the estimated power consumption level for the set of modem functional blocks of the chipset.

At 415, a chipset 405 of a UE may identify a set of multiple modes of a set of modes in which at least one modem functional block of a set of modem functional blocks of a chipset of the UE operates during at least a portion of a time interval, each respective modem functional block of the set of modem functional blocks including a set of modem units classified to have a power response that satisfies a power response trend metric for at least one mode of the set of multiple modes. In some examples, the power response for at least one input parameter type that satisfies the power response trend metric for at least one mode of the set of multiple modes. Each modem unit of the set of modem units may be a SOC unit, a DRAM unit, a PMIC unit, a modem unit, a transceiver unit, a RF unit, a PA unit, or a LNA unit. In some cases, the SOC unit may include one or more sub-units, where each sub-unit may be referred to as a modem unit. There may be multiple sub-units within an SOC unit. A modem unit may be part of an SOC. However, a modem unit may be treated as a separate equation and separate block for equation purposes.

In some cases, chipset 405 may identify one or more modem functional blocks of the set of modem functional blocks of the chipset that operates during at least a portion of the time interval.

At 420, chipset 405 may select a set of multiple power estimate calculation equations of a set of power estimate calculation equations based on the set of multiple modes. In some implementations, chipset 405 may select the set of multiple power estimate calculation equations of the set of power estimate calculation equations based on each power estimate calculation equation of the selected set being associated with at least one modem functional block of the set of modem functional blocks and at least one mode of the set of modes in which the modem functional block operated in during at least a portion of the time interval.

In some cases, chipset 405 may determine a first power estimate calculation equation from the set of power estimate calculation equations to calculate a first estimated subpower consumption level for a first modem functional block of the set of modem functional blocks based on the first modem functional block operating, during at least a portion of the time interval, in a first mode corresponding to the first power estimate calculation equation. The chipset 405 may calculate the first estimated subpower consumption level for the first modem functional block corresponding to the time interval based on the first power estimate calculation equation, where the estimated power consumption level is calculated based on the first estimated subpower consumption level.

In some cases, chipset 405 may determine a second power estimate calculation equation from the set of power estimate calculation equations to calculate a second estimated sub-power consumption level for a second modem functional block of the set of modem functional blocks based on the second modem functional block operating, during at least a portion of the time interval, in the first mode corresponding to the second power estimate calculation equation. The chipset 405 may calculate the second estimated subpower consumption level for the second modem functional block corresponding to the time interval based on the second power estimate calculation equation, where the estimated power consumption level is calculated based on the second estimated subpower consumption level.

In some cases, chipset 405 may determine a second power estimate calculation equation from the set of power estimate calculation equations to calculate a second estimated sub-power consumption level for the first modem functional block of the set of modem functional blocks based on the first modem functional block operating, during a second portion of the time interval, in a second mode corresponding to the second power estimate calculation equation. The chipset 405 may calculate the second estimated subpower consumption level for the first modem functional block during the second portion of the time interval based on the second power estimate calculation equation, where the estimated power consumption level is calculated based on the second estimated subpower consumption level.

In some implementations, chipset 405 may determine a communication parameter value for the at least one input parameter type corresponding to a first power estimate calculation equation of the set of multiple power estimate calculation equations, and calculate a first estimated subpower consumption level based on the first power estimate calculation equation and the communication parameter value for the at least one input parameter type, where the estimated power consumption level is calculated based on the first estimated subpower consumption level. The communication parameter value may be a number of layers, or a bandwidth per layer, or a total allocated bandwidth, or a combination thereof. These are just examples of possible communication parameters, such that the communication parameter is not limited to a number of layers, or a bandwidth per layer, or a total allocated bandwidth.

At 425, chipset 405 may calculate an estimated power consumption level for the chipset for the time interval based on the set of multiple power estimate calculation equations and a proportion of the time interval a respective multiple modem functional block of the set of modem functional blocks operates in a respective mode of the set of multiple modes.

In some implementations, chipset 405 may calculate a set of estimated subpower consumption levels corresponding to a respective modem functional block of the set of modem functional blocks, each estimated subpower consumption level of the set of estimated subpower consumption levels calculated using a respective power estimate calculation equation of the set of power estimate calculation equations. Chipset 405 may adjust each estimated subpower consumption level of the set of estimated subpower consumption levels based on multiplying each estimated subpower consumption level by a proportion of the time interval each respective modem functional block operated in the respective mode, and calculate the estimated power consumption level based on adding the adjusted estimated subpower consumption levels.

In some cases, chipset 405 may calculate the estimated power consumption level based on a weighted average of a set of estimated subpower consumption levels calculated for a respective modem functional block of the set of modem functional blocks that operated in multiple modes during the time interval. In some implementations, chipset 405 may calculate, for each period of the time interval, a subsequent estimated power consumption level for the set of modem functional blocks for a corresponding period of the time interval.

At 430, chipset 405 may control operation of at least one component of the UE based on the estimated power consumption level. In some cases, some other device, such as processor 410 may control operation of at least one component of the UE based on the estimated power consumption level. In some cases, controlling the operation may include adjusting a power usage scheme corresponding to at least one modem functional block of the set of modem functional blocks and/or adjusting a thermal mitigation scheme corresponding to at least one modem functional block of the set of modem functional blocks.

Figure 5:
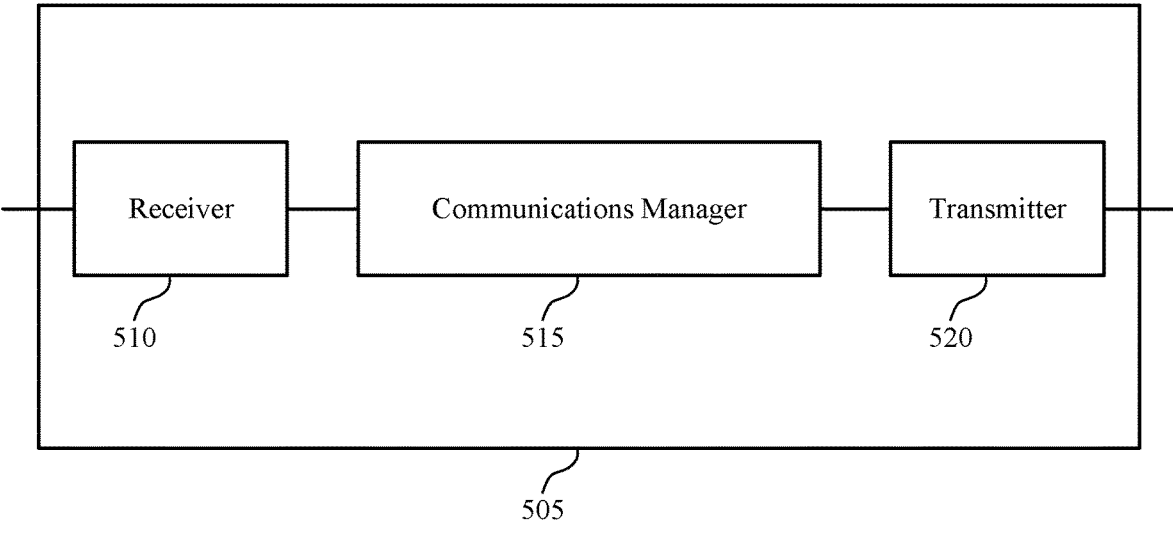
FIGS. 5 and 6 show diagrams of devices that support techniques for estimating power consumption of a chipset in accordance with aspects of the present disclosure.

FIG. 5 shows a diagram 500 of a device 505 that supports techniques for estimating power consumption of a chipset in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for estimating power consumption of a chipset, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a set of multiple modes of a set of modes in which at least one modem functional block of a set of modem functional blocks of a chipset of the UE operates during at least a portion of a time interval, each respective modem functional block of the set of modem functional blocks including a set of modem units classified to have a power response that satisfies a power response trend metric for at least one mode of the set of multiple modes, select a set of multiple power estimate calculation equations of a set of power estimate calculation equations based on the set of multiple modes, calculate an estimated power consumption level for the chipset for the time interval based on the set of multiple power estimate calculation equations and a proportion of the time interval a respective multiple modem functional block of the set of modem functional blocks operates in a respective mode of the set of multiple modes, and control operation of at least one component of the UE based on the estimated power consumption level. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some implementations, the communications manager 515 may be a software layer that interacts with software running for the receiver 510, baseband processor, transmitter 520. As such, the communications manager 515 (e.g., hardware, software, or a combination thereof) may be an engine that communicates with software of all engines working on receiving, baseband, and transmitting.

The communications manager 515 as described herein may be implemented to realize one or more potential advantages. One implementation may allow the device 505 to efficiently estimate power consumption of the device 505 in real-time. For example, a device 505 may be configured with a power estimator tool to determine the power estimation of the device 505, that may allow the device to take action to conserve battery life and/or thermal effects of the device 505.

Based on implementing the power consumption estimation techniques as described herein, a processor of a UE 115 (e.g., controlling the receiver 510, the transmitter 520, or the transceiver 820 as described with reference to FIG. 8) may increase reliability and efficiency in the power consumption estimation of a UE 115 or of one or more components of a UE.

Figure 6:
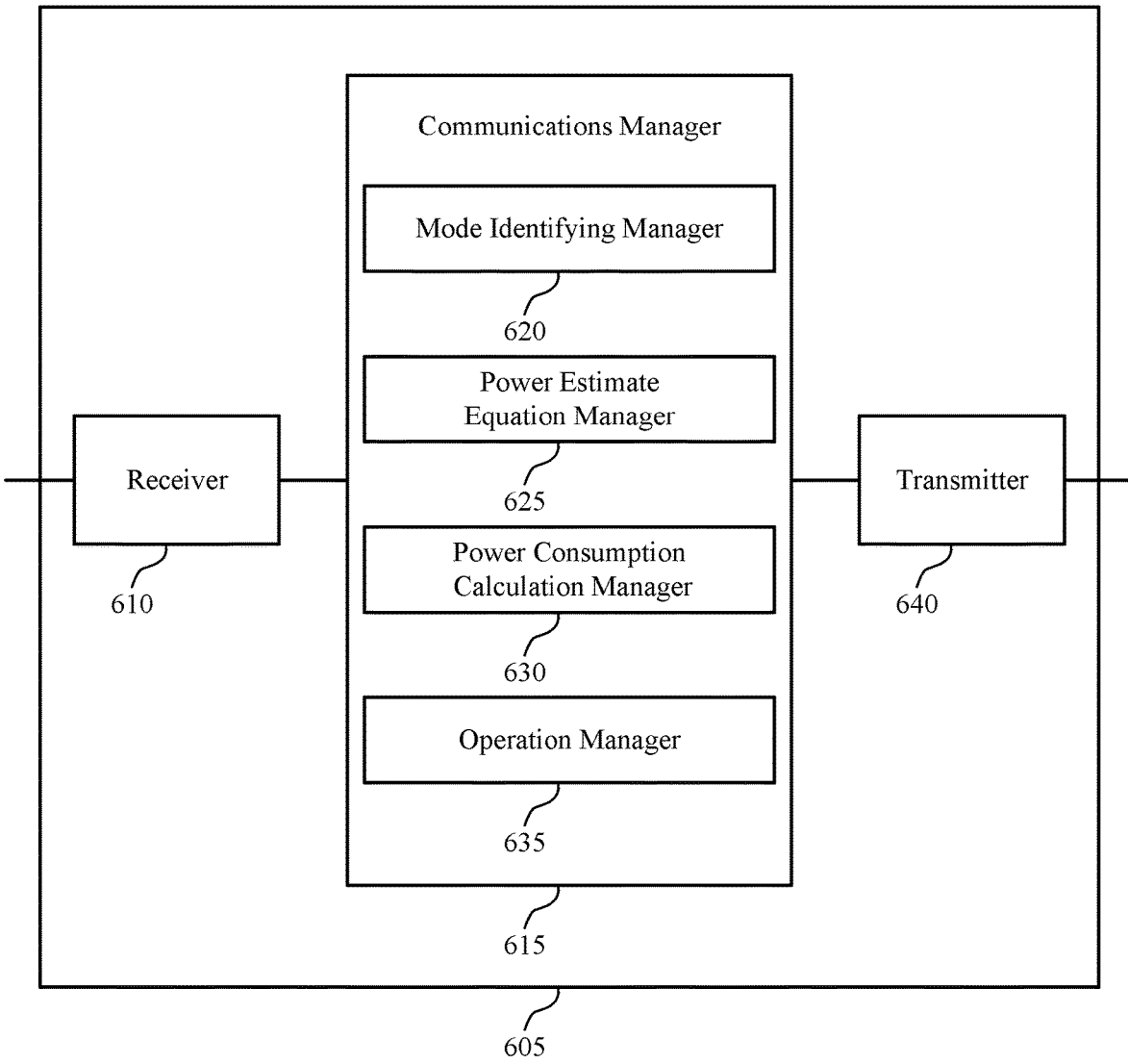

FIG. 6 shows a diagram 600 of a device 605 that supports techniques for estimating power consumption of a chipset in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to techniques for estimating power consumption of a chipset, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a mode identifying manager 620, a power estimate equation manager 625, a power consumption calculation manager 630, and an operation manager 635. The communications manager 615 may be an example of aspects of the communications manager 810 described herein.

The mode identifying manager 620 may identify a set of multiple modes of a set of modes in which at least one modem functional block of a set of modem functional blocks of a chipset of the UE operates during at least a portion of a time interval, each respective modem functional block of the set of modem functional blocks including a set of modem units classified to have a power response that satisfies a power response trend metric for at least one mode of the set of multiple modes.

The power estimate equation manager 625 may select a set of multiple power estimate calculation equations of a set of power estimate calculation equations based on the set of multiple modes. The power consumption calculation manager 630 may calculate an estimated power consumption level for the chipset for the time interval based on the set of multiple power estimate calculation equations and a proportion of the time interval a respective multiple modem functional block of the set of modem functional blocks operates in a respective mode of the set of multiple modes. The operation manager 635 may control operation of at least one component of the UE based on the estimated power consumption level.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
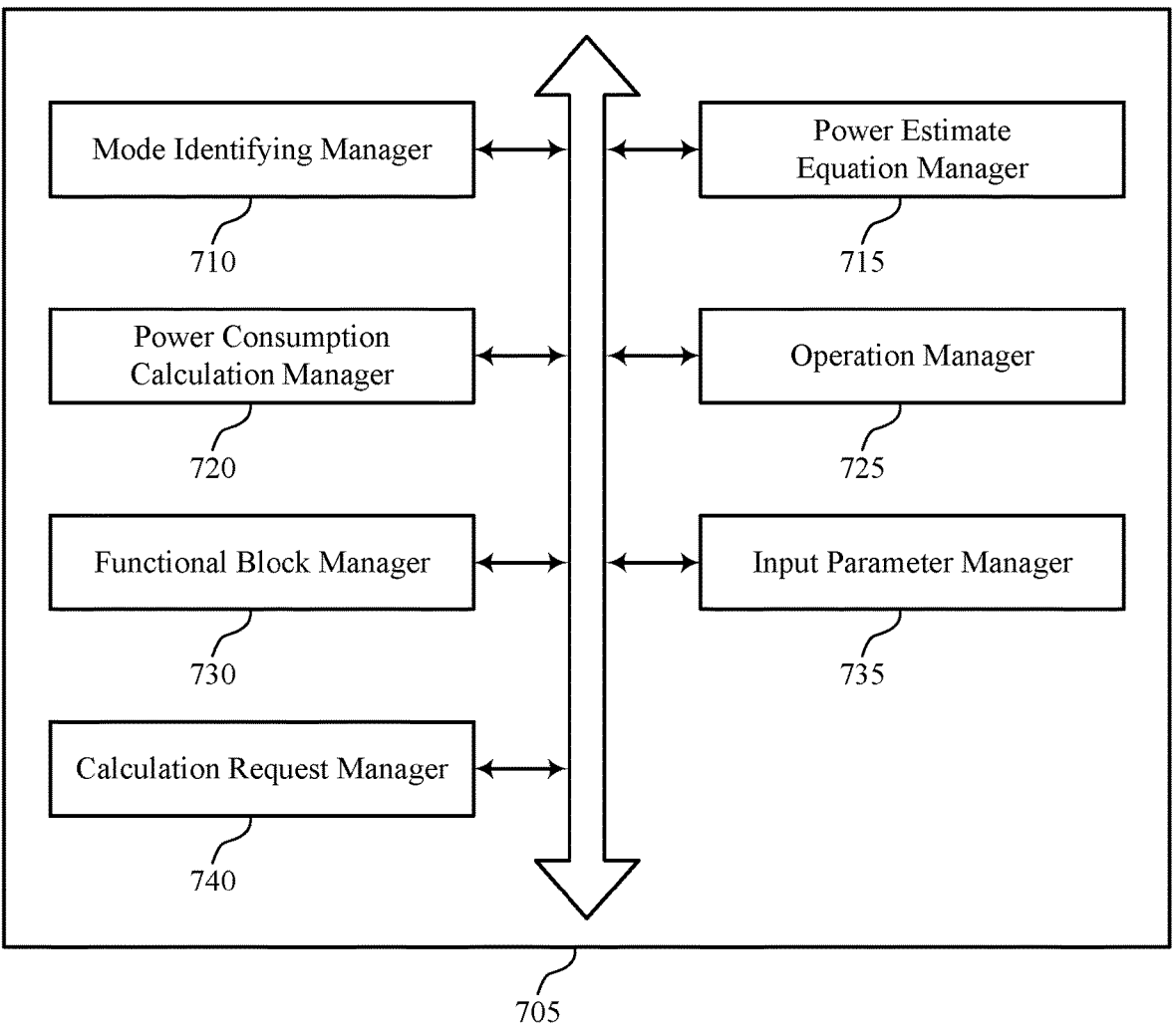
FIG. 7 shows a diagram of a communications manager that supports techniques for estimating power consumption of a chipset in accordance with aspects of the present disclosure.

FIG. 7 shows a diagram 700 of a communications manager 705 that supports techniques for estimating power consumption of a chipset in accordance with aspects of the present disclosure. The communications manager 705 may be an example of aspects of a communications manager 515, a communications manager 615, or a communications manager 810 described herein. The communications manager 705 may include a mode identifying manager 710, a power estimate equation manager 715, a power consumption calculation manager 720, an operation manager 725, a functional block manager 730, an input parameter manager 735, and a calculation request manager 740. Each of these modules may communicate, directly or indirectly, with one another (e.g., via one or more buses).

The mode identifying manager 710 may identify a set of multiple modes of a set of modes in which at least one modem functional block of a set of modem functional blocks of a chipset of the UE operates during at least a portion of a time interval, each respective modem functional block of the set of modem functional blocks including a set of modem units classified to have a power response that satisfies a power response trend metric for at least one mode of the set of multiple modes. The power estimate equation manager 715 may select a set of multiple power estimate calculation equations of a set of power estimate calculation equations based on the set of multiple modes. The power consumption calculation manager 720 may calculate an estimated power consumption level for the chipset for the time interval based on the set of multiple power estimate calculation equations and a proportion of the time interval a respective multiple modem functional block of the set of modem functional blocks operates in a respective mode of the set of multiple modes. The operation manager 725 may control operation of at least one component of the UE based on the estimated power consumption level.

In some cases, each modem unit of the set of modem units is a system on chip (SOC) unit, a dynamic random access memory (DRAM) unit, a power management integrated circuit (PMIC) unit, a modem unit, a transceiver unit, a radio frequency (RF) unit, a power amplifier (PA) unit, or a low-noise amplifier (LNA) unit.

In some examples, the power estimate equation manager 715 may determine a first power estimate calculation equation from the set of power estimate calculation equations to calculate a first estimated subpower consumption level for a first modem functional block of the set of modem functional blocks based on the first modem functional block operating, during at least a portion of the time interval, in a first mode corresponding to the first power estimate calculation equation. In some examples, the power estimate equation manager 715 may determine a second power estimate calculation equation from the set of power estimate calculation equations to calculate a second estimated subpower consumption level for a second modem functional block of the set of modem functional blocks based on the second modem functional block operating, during at least a portion of the time interval, in the first mode corresponding to the second power estimate calculation equation.

In some examples, the power estimate equation manager 715 may determine a second power estimate calculation equation from the set of power estimate calculation equations to calculate a second estimated subpower consumption level for the first modem functional block of the set of modem functional blocks based on the first modem functional block operating, during a second portion of the time interval, in a second mode corresponding to the second power estimate calculation equation. In some examples, the power estimate equation manager 715 may select the set of multiple power estimate calculation equations of the set of power estimate calculation equations based on each power estimate calculation equation of the selected set being associated with at least one modem functional block of the set of modem functional blocks and at least one mode of the set of modes in which the modem functional block operated in during at least a portion of the time interval.

In some examples, the power consumption calculation manager 720 may calculate the first estimated subpower consumption level for the first modem functional block corresponding to the time interval based on the first power estimate calculation equation, where the estimated power consumption level is calculated based on the first estimated subpower consumption level. In some examples, the power consumption calculation manager 720 may calculate the second estimated subpower consumption level for the second modem functional block corresponding to the time interval based on the second power estimate calculation equation, where the estimated power consumption level is calculated based on the second estimated subpower consumption level.

In some examples, the power consumption calculation manager 720 may calculate the second estimated subpower consumption level for the first modem functional block during the second portion of the time interval based on the second power estimate calculation equation, where the estimated power consumption level is calculated based on the second estimated subpower consumption level. In some examples, the power consumption calculation manager 720 may calculate a set of estimated subpower consumption levels corresponding to a respective modem functional block of the set of modem functional blocks, each estimated subpower consumption level of the set of estimated subpower consumption levels calculated using a respective power estimate calculation equation of the set of power estimate calculation equations.

In some examples, the power consumption calculation manager 720 may adjust each estimated subpower consumption level of the set of estimated subpower consumption levels based on multiplying each estimated subpower consumption level by a proportion of the time interval each respective modem functional block operated in the respective mode. In some examples, the power consumption calculation manager 720 may calculate the estimated power consumption level based on adding the adjusted estimated subpower consumption levels.

In some examples, the power consumption calculation manager 720 may calculate the estimated power consumption level based on a weighted average of a set of estimated subpower consumption levels calculated for a respective modem functional block of the set of modem functional blocks that operated in multiple modes during the time interval. In some examples, the power consumption calculation manager 720 may calculate a first estimated subpower consumption level based on the first power estimate calculation equation and the communication parameter value for the at least one input parameter type, where the estimated power consumption level is calculated based on the first estimated subpower consumption level. In some examples, the power consumption calculation manager 720 may calculate, for each period of the time interval, a subsequent estimated power consumption level for the set of modem functional blocks for a corresponding period of the time interval.

In some examples, the operation manager 725 may adjust a power usage scheme corresponding to at least one modem functional block of the set of modem functional blocks. In some examples, the operation manager 725 may adjust a thermal mitigation scheme corresponding to at least one modem functional block of the set of modem functional blocks.

The functional block manager 730 may identify one or more modem functional blocks of the set of modem functional blocks of the chipset that operates during at least a portion of the time interval.

The input parameter manager 735 may determine a communication parameter value for the at least one input parameter type corresponding to a first power estimate calculation equation of the set of multiple power estimate calculation equations.

In some cases, the communication parameter value is a number of layers, or a bandwidth per layer, or a total allocated bandwidth, or a combination thereof. The communication parameter value may not be limited to the parameters described herein. Any number of communication parameters may be defined.

The calculation request manager 740 may receive a command requesting calculation of the estimated power consumption level for the chipset. In some examples, the calculation request manager 740 may receive the command that indicates a duration of the time interval over which to calculate the estimated power consumption level for the set of modem functional blocks of the chipset.

Figure 8:
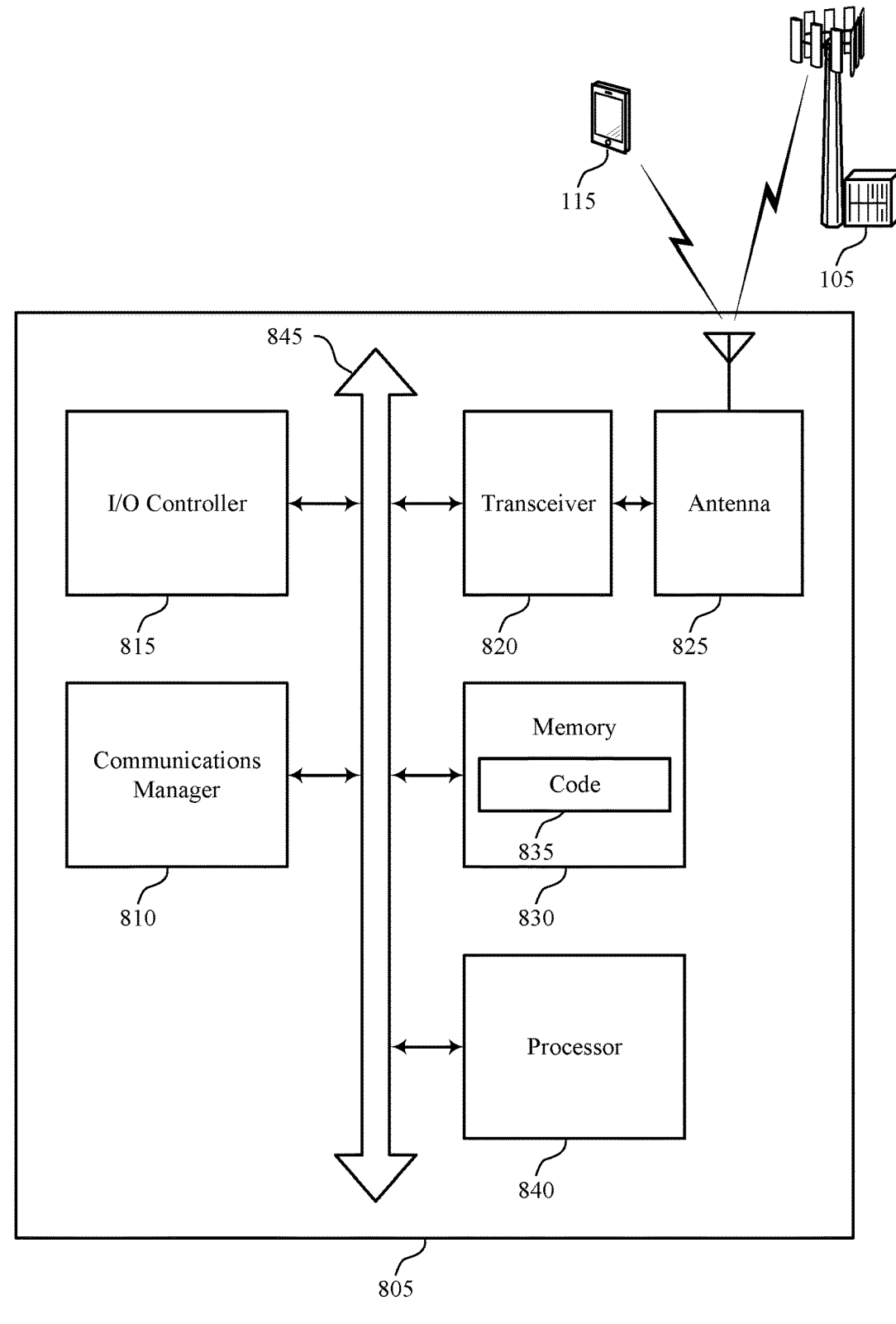
FIG. 8 shows a diagram of a system including a device that supports techniques for estimating power consumption of a chipset in accordance with aspects of the present disclosure.

FIG. 8 shows a diagram of a system 800 including a device 805 that supports techniques for estimating power consumption of a chipset in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a set of multiple modes of a set of modes in which at least one modem functional block of a set of modem functional blocks of a chipset of the UE operates during at least a portion of a time interval, each respective modem functional block of the set of modem functional blocks including a set of modem units classified to have a power response that satisfies a power response trend metric for at least one mode of the set of multiple modes, select a set of multiple power estimate calculation equations of a set of power estimate calculation equations based on the set of multiple modes, calculate an estimated power consumption level for the chipset for the time interval based on the set of multiple power estimate calculation equations and a proportion of the time interval a respective multiple modem functional block of the set of modem functional blocks operates in a respective mode of the set of multiple modes, and control operation of at least one component of the UE based on the estimated power consumption level.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for estimating power consumption of a chipset).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

FIG. 9 shows a flowchart illustrating a method 900 that supports techniques for estimating power consumption of a chipset in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 905, the UE may identify a set of multiple modes of a set of modes in which at least one modem functional block of a set of modem functional blocks of a chipset of the UE operates during at least a portion of a time interval, each respective modem functional block of the set of modem functional blocks including a set of modem units classified to have a power response that satisfies a power response trend metric for at least one mode of the set of multiple modes. The operations of 905 may be performed according to the methods described herein. In some examples, aspects of the operations of 905 may be performed by a mode identifying manager as described with reference to FIGS. 5 through 8.

At 910, the UE may select a set of multiple power estimate calculation equations of a set of power estimate calculation equations based on the set of multiple modes. The operations of 910 may be performed according to the methods described herein. In some examples, aspects of the operations of 910 may be performed by a power estimate equation manager as described with reference to FIGS. 5 through 8.

At 915, the UE may calculate an estimated power consumption level for the chipset for the time interval based on the set of multiple power estimate calculation equations and a proportion of the time interval a respective multiple modem functional block of the set of modem functional blocks operates in a respective mode of the set of multiple modes. The operations of 915 may be performed according to the methods described herein. In some examples, aspects of the operations of 915 may be performed by a power consumption calculation manager as described with reference to FIGS. 5 through 8.

At 920, the UE may control operation of at least one component of the UE based on the estimated power consumption level. The operations of 920 may be performed according to the methods described herein. In some examples, aspects of the operations of 920 may be performed by an operation manager as described with reference to FIGS. 5 through 8.

FIG. 10 shows a flowchart illustrating a method 1000 that supports techniques for estimating power consumption of a chipset in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1005, the UE may identify a set of multiple modes of a set of modes in which at least one modem functional block of a set of modem functional blocks of a chipset of the UE operates during at least a portion of a time interval, each respective modem functional block of the set of modem functional blocks including a set of modem units classified to have a power response that satisfies a power response trend metric for at least one mode of the set of multiple modes. The operations of 1005 may be performed according to the methods described herein. In some examples, aspects of the operations of 1005 may be performed by a mode identifying manager as described with reference to FIGS. 5 through 8.

At 1010, the UE may identify one or more modem functional blocks of the set of modem functional blocks of the chipset that operates during at least a portion of the time interval. The operations of 1010 may be performed according to the methods described herein. In some examples, aspects of the operations of 1010 may be performed by a functional block manager as described with reference to FIGS. 5 through 8.

At 1015, the UE may select a set of multiple power estimate calculation equations of a set of power estimate calculation equations based on the set of multiple modes. The operations of 1015 may be performed according to the methods described herein. In some examples, aspects of the operations of 1015 may be performed by a power estimate equation manager as described with reference to FIGS. 5 through 8.

At 1020, the UE may calculate an estimated power consumption level for the chipset for the time interval based on the set of multiple power estimate calculation equations and a proportion of the time interval a respective multiple modem functional block of the set of modem functional blocks operates in a respective mode of the set of multiple modes. The operations of 1020 may be performed according to the methods described herein. In some examples, aspects of the operations of 1020 may be performed by a power consumption calculation manager as described with reference to FIGS. 5 through 8.

At 1025, the UE may control operation of at least one component of the UE based on the estimated power consumption level. The operations of 1025 may be performed according to the methods described herein. In some examples, aspects of the operations of 1025 may be performed by an operation manager as described with reference to FIGS. 5 through 8.

FIG. 11 shows a flowchart illustrating a method 1100 that supports techniques for estimating power consumption of a chipset in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1105, the UE may identify a set of multiple modes of a set of modes in which at least one modem functional block of a set of modem functional blocks of a chipset of the UE operates during at least a portion of a time interval, each respective modem functional block of the set of modem functional blocks including a set of modem units classified to have a power response that satisfies a power response trend metric for at least one mode of the set of multiple modes. The operations of 1105 may be performed according to the methods described herein. In some examples, aspects of the operations of 1105 may be performed by a mode identifying manager as described with reference to FIGS. 5 through 8.

At 1110, the UE may select a set of multiple power estimate calculation equations of a set of power estimate calculation equations based on the set of multiple modes. The operations of 1110 may be performed according to the methods described herein. In some examples, aspects of the operations of 1110 may be performed by a power estimate equation manager as described with reference to FIGS. 5 through 8.

At 1115, the UE may calculate a set of estimated sub-power consumption levels corresponding to a respective modem functional block of the set of modem functional blocks, each estimated subpower consumption level of the set of estimated subpower consumption levels calculated using a respective power estimate calculation equation of the set of power estimate calculation equations. The operations of 1115 may be performed according to the methods described herein. In some examples, aspects of the operations of 1115 may be performed by a power consumption calculation manager as described with reference to FIGS. 5 through 8.

At 1120, the UE may adjust each estimated subpower consumption level of the set of estimated subpower consumption levels based on multiplying each estimated subpower consumption level by a proportion of the time interval each respective modem functional block operated in a respective mode. The operations of 1120 may be performed according to the methods described herein. In some examples, aspects of the operations of 1120 may be performed by a power consumption calculation manager as described with reference to FIGS. 5 through 8.

At 1125, the UE may calculate the estimated power consumption level based on adding the adjusted estimated subpower consumption levels. The operations of 1125 may be performed according to the methods described herein. In some examples, aspects of the operations of 1125 may be performed by a power consumption calculation manager as described with reference to FIGS. 5 through 8.

At 1130, the UE may calculate an estimated power consumption level for the chipset for the time interval based on the set of multiple power estimate calculation equations and a proportion of the time interval a respective multiple modem functional block of the set of modem functional blocks operates in the respective mode of the set of multiple modes. The operations of 1130 may be performed according to the methods described herein. In some examples, aspects of the operations of 1130 may be performed by a power consumption calculation manager as described with reference to FIGS. 5 through 8.

At 1135, the UE may control operation of at least one component of the UE based on the estimated power consumption level. The operations of 1135 may be performed according to the methods described herein. In some examples, aspects of the operations of 1135 may be performed by an operation manager as described with reference to FIGS. 5 through 8.

The following provides an overview of aspects of the present disclosure:

Aspect 1: A method for wireless communications at a UE, comprising: identifying a set of multiple modes of a plurality of modes in which at least one modem functional block of a plurality of modem functional blocks of a chipset of the UE operates during at least a portion of a time interval, each respective modem functional block of the plurality of modem functional blocks comprising a plurality of modem units classified to have a power response that satisfies a power response trend metric for at least one mode of the set of multiple modes; selecting a set of multiple power estimate calculation equations of a plurality of power estimate calculation equations based at least in part on the set of multiple modes; calculating an estimated power consumption level for the chipset for the time interval based at least in part on the set of multiple power estimate calculation equations and a proportion of the time interval a respective multiple modem functional block of the plurality of modem functional blocks operates in a respective mode of the set of multiple modes; and controlling operation of at least one component of the UE based at least in part on the estimated power consumption level.

Aspect 2: The method of aspect 1, further comprising: identifying one or more modem functional blocks of the plurality of modem functional blocks of the chipset that operates during at least the portion of the time interval.

Aspect 3: The method of any of aspects 1 through 2, further comprising: determining a first power estimate calculation equation from the plurality of power estimate calculation equations to calculate a first estimated subpower consumption level for a first modem functional block of the plurality of modem functional blocks based at least in part on the first modem functional block operating, during at least the portion of the time interval, in a first mode corresponding to the first power estimate calculation equation; and calculating the first estimated subpower consumption level for the first modem functional block corresponding to the time interval based at least in part on the first power estimate calculation equation, wherein the estimated power consumption level is calculated based at least in part on the first estimated subpower consumption level.

Aspect 4: The method of aspect 3, further comprising: determining a second power estimate calculation equation from the plurality of power estimate calculation equations to calculate a second estimated subpower consumption level for a second modem functional block of the plurality of modem functional blocks based at least in part on the second modem functional block operating, during at least the portion of the time interval, in the first mode corresponding to the second power estimate calculation equation; and calculating the second estimated subpower consumption level for the second modem functional block corresponding to the time interval based at least in part on the second power estimate calculation equation, wherein the estimated power consumption level is calculated based at least in part on the second estimated subpower consumption level.

Aspect 5: The method of any of aspects 3 through 4, further comprising: determining a second power estimate calculation equation from the plurality of power estimate calculation equations to calculate a second estimated subpower consumption level for the first modem functional block of the plurality of modem functional blocks based at least in part on the first modem functional block operating, during a second portion of the time interval, in a second mode corresponding to the second power estimate calculation equation; and calculating the second estimated subpower consumption level for the first modem functional block during the second portion of the time interval based at least in part on the second power estimate calculation equation, wherein the estimated power consumption level is calculated based at least in part on the second estimated subpower consumption level.

Aspect 6: The method of any of aspects 1 through 5, wherein selecting the set of multiple power estimate calculation equations further comprises: selecting the set of multiple power estimate calculation equations of the plurality of power estimate calculation equations based at least in part on each power estimate calculation equation of the selected set being associated with at least one modem functional block of the plurality of modem functional blocks and the at least one mode of the plurality of modes in which the modem functional block operated in during at least the portion of the time interval.

Aspect 7: The method of any of aspects 1 through 6, wherein calculating the estimated power consumption level further comprises: calculating a plurality of estimated subpower consumption levels corresponding to a respective modem functional block of the plurality of modem functional blocks, each estimated subpower consumption level of the plurality of estimated subpower consumption levels calculated using a respective power estimate calculation equation of the plurality of power estimate calculation equations; adjusting each estimated subpower consumption level of the plurality of estimated subpower consumption levels based at least in part on multiplying each estimated subpower consumption level by the proportion of the time interval each respective modem functional block operated in a respective mode; and calculating the estimated power consumption level based at least in part on adding the adjusted estimated subpower consumption levels.

Aspect 8: The method of any of aspects 1 through 7, wherein calculating the estimated power consumption level further comprises: calculating the estimated power consumption level based at least in part on a weighted average of a plurality of estimated subpower consumption levels calculated for a respective modem functional block of the plurality of modem functional blocks that operated in multiple modes during the time interval.

Aspect 9: The method of any of aspects 1 through 8, wherein the power response that satisfies the power response trend metric for at least one mode of the set of multiple modes is associated with at least one input parameter type.

Aspect 10: The method of aspect 9, further comprising: determining a communication parameter value for the at least one input parameter type corresponding to a first power estimate calculation equation of the set of multiple power estimate calculation equations; and calculating a first estimated subpower consumption level based at least in part on the first power estimate calculation equation and the communication parameter value for the at least one input parameter type, wherein the estimated power consumption level is calculated based at least in part on the first estimated subpower consumption level.

Aspect 11: The method of aspect 10, wherein the communication parameter value is a number of layers, or a bandwidth per layer, or a total allocated bandwidth, or a combination thereof.

Aspect 12: The method of any of aspects 1 through 11, wherein controlling the operation further comprises: adjusting a power usage scheme corresponding to at least one modem functional block of the plurality of modem functional blocks.

Aspect 13: The method of any of aspects 1 through 12, wherein controlling the operation further comprises: adjusting a thermal mitigation scheme corresponding to at least one modem functional block of the plurality of modem functional blocks.

Aspect 14: The method of any of aspects 1 through 13, wherein each modem unit of the plurality of modem units is a system on chip (SOC) unit, a dynamic random access memory (DRAM) unit, a power management integrated circuit (PMIC) unit, a modem subunit, a transceiver unit, a radio frequency (RF) unit, a power amplifier (PA) unit, or a low-noise amplifier (LNA) unit.

Aspect 15: The method of any of aspects 1 through 14, further comprising: receiving a command requesting calculation of the estimated power consumption level for the chipset.

Aspect 16: The method of aspect 15, wherein receiving the command requesting calculation of the estimated power consumption level further comprises: receiving the command that indicates a duration of the time interval over which to calculate the estimated power consumption level for the plurality of modem functional blocks of the chipset.

Aspect 17: The method of any of aspects 1 through 16, further comprising: calculating, for each period of the time interval, a subsequent estimated power consumption level for the plurality of modem functional blocks for a corresponding period of the time interval.

Aspect 18: An apparatus for wireless communications at a UE, comprising a processor; memory coupled with the processor; and instructions stored in the memory and executable by the processor to cause the apparatus to perform a method of any of aspects 1 through 17.

Aspect 19: An apparatus for wireless communications at a UE, comprising at least one means for performing a method of any of aspects 1 through 17.

Aspect 20: A non-transitory computer-readable medium storing code for wireless communications at a UE, the code comprising instructions executable by a processor to perform a method of any of aspects 1 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, WCDMA, 2G, 3G, or NR system may be described for purposes of example, and LTE, LTE-A, LTE-A Pro, WCDMA, 2G, 3G, or NR terminology may be used in much of the description, the techniques described herein are applicable beyond LTE, LTE-A, LTE-A Pro, WCDMA, 2G, 3G, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE), comprising:
one or more processors;
one or more memories coupled with the one or more processors; and instructions stored in the one or more memories and executable by the one or more processors to cause the UE to:

identify, by the UE, a set of multiple modes of a plurality of modes in which at least one modem functional block of a plurality of modem functional blocks of a chipset of the UE operates for wireless communications during at least a portion of a time interval, each mode of the set of multiple modes comprising a combination of a wireless communications type and an action performed by the UE for operations in the wireless communications type one or more operations corresponding to a radio access technology, each of the one or more operations corresponding to a power response trend, and each respective modem functional block of the plurality of modem functional blocks comprising a plurality of modem units components of the chipset classified to have a power response that satisfies a power response trend metric for at least one mode of the set of multiple modes;

select, by the UE from a lookup table, a set of multiple pre-configured power estimate calculation equations of a plurality of pre-configured power estimate calculation equations based at least in part on the set of multiple modes, each pre-configured power estimate calculation equation of the selected set being formed in accordance with a combination of a respective modem functional block of the plurality of modem functional blocks and a respective mode of the set of multiple modes, wherein each entry of the lookup table indicates a respective pre-configured power estimation calculation equation of the plurality of pre-configured power estimate calculation equations and corresponds to one of the respective combinations of the respective modem functional blocks of the plurality of modem functional blocks and the respective modes of the set of multiple modes;

calculate, by the UE, an estimated power consumption level for the chipset for the time interval based at least in part on the set of multiple pre-configured power estimate calculation equations and a proportion of the time interval a respective modem functional block of the plurality of modem functional blocks operates in a respective mode of the set of multiple modes, and based at least in part on a weighted average of a plurality of estimated subpower consumption levels calculated for each respective modem functional block of the plurality of modem functional blocks that operated in the set of multiple modes during the time interval, wherein each estimated subpower consumption level is associated with a given weight for the weighted average; and control operation of at least one component of the UE based at least in part on the estimated power consumption level.

2. The UE of claim 1, wherein the instructions are further executable by the one or more processors to cause the UE to:

identify one or more modem functional blocks of the plurality of modem functional blocks of the chipset that operates during at least the portion of the time interval.

3. The UE of claim 1, wherein the instructions are further executable by the one or more processors to cause the UE to:

determine a first pre-configured power estimate calculation equation from the plurality of pre-configured power estimate calculation equations to calculate a first estimated subpower consumption level for a first modem functional block of the plurality of modem functional blocks based at least in part on the first modem functional block operating, during at least the portion of the time interval, in a first mode corresponding to the first pre-configured power estimate calculation equation; and calculate the first estimated subpower consumption level for the first modem functional block corresponding to the time interval based at least in part on the first pre-configured power estimate calculation equation, wherein the estimated power consumption level is calculated based at least in part on the first estimated subpower consumption level.

4. The UE of claim 3, wherein the instructions are further executable by the one or more processors to cause the UE to:

determine a second pre-configured power estimate calculation equation from the plurality of pre-configured power estimate calculation equations to calculate a second estimated subpower consumption level for a second modem functional block of the plurality of modem functional blocks based at least in part on the second modem functional block operating, during at least the portion of the time interval, in the first mode corresponding to the second pre-configured power estimate calculation equation; and calculate the second estimated subpower consumption level for the second modem functional block corresponding to the time interval based at least in part on the second pre-configured power estimate calculation equation, wherein the estimated power consumption level is calculated based at least in part on the second estimated subpower consumption level.

5. The UE of claim 3, wherein the instructions are further executable by the one or more processors to cause the UE to:

determine a second pre-configured power estimate calculation equation from the plurality of pre-configured power estimate calculation equations to calculate a second estimated subpower consumption level for the first modem functional block of the plurality of modem functional blocks based at least in part on the first modem functional block operating, during a second portion of the time interval, in a second mode corresponding to the second pre-configured power estimate calculation equation; and calculate the second estimated subpower consumption level for the first modem functional block during the second portion of the time interval based at least in part on the second pre-configured power estimate calculation equation, wherein the estimated power consumption level is calculated based at least in part on the second estimated subpower consumption level.

6. The UE of claim 1, wherein the instructions to calculate the estimated power consumption level are further executable by the one or more processors to cause the UE to:

calculate the plurality of estimated subpower consumption levels corresponding to the respective modem functional block of the plurality of modem functional blocks, each estimated subpower consumption level of the plurality of estimated subpower consumption levels calculated using a respective pre-configured power estimate calculation equation of the plurality of pre-configured power estimate calculation equations;

adjust each estimated subpower consumption level of the plurality of estimated subpower consumption levels based at least in part on multiplying each estimated subpower consumption level by the proportion of the time interval each respective modem functional block operated in the respective mode; and calculate the estimated power consumption level based at least in part on adding the adjusted estimated subpower consumption levels.

7. The UE of claim 1, wherein the power response that satisfies the power response trend metric for the at least one mode of the set of multiple modes is associated with at least one input parameter type.

8. The UE of claim 7, wherein the instructions are further executable by the one or more processors to cause the UE to:
determine a communication parameter value for the at least one input parameter type corresponding to a first pre-configured power estimate calculation equation of the set of multiple pre-configured power estimate calculation equations; and
calculate a first estimated subpower consumption level based at least in part on the first pre-configured power estimate calculation equation and the communication parameter value for the at least one input parameter type, wherein the estimated power consumption level is calculated based at least in part on the first estimated subpower consumption level.

9. The UE of claim 8, wherein the communication parameter value is a number of layers, or a bandwidth per layer, or a total allocated bandwidth, or a combination thereof.

10. The UE of claim 1, wherein the instructions to control the operation are further executable by the one or more processors to cause the UE to:
adjust a power usage scheme corresponding to the at least one modem functional block of the plurality of modem functional blocks.

11. The UE of claim 1, wherein the instructions to control the operation are further executable by the one or more processors to cause the UE to:
adjust a thermal mitigation scheme corresponding to the at least one modem functional block of the plurality of modem functional blocks.

12. The UE of claim 1, wherein each component of the chipset of the plurality of components of the chipset is a system on chip (SOC) unit, a dynamic random access memory (DRAM) unit, a power management integrated circuit (PMIC) unit, a modem subunit, a transceiver unit, a radio frequency (RF) unit, a power amplifier (PA) unit, or a low-noise amplifier (LNA) unit.

13. The UE of claim 1, wherein the instructions are further executable by the one or more processors to cause the UE to:
receive a command requesting calculation of the estimated power consumption level for the chipset.

14. The UE of claim 13, wherein the instructions to receive the command requesting calculation of the estimated power consumption level are further executable by the one or more processors to cause the UE to:
receive the command that indicates a duration of the time interval over which to calculate the estimated power consumption level for the plurality of modem functional blocks of the chipset.

15. The UE of claim 1, wherein the instructions are further executable by the one or more processors to cause the UE to:
calculate, for each period of the time interval, a subsequent estimated power consumption level for the plurality of modem functional blocks for a corresponding period of the time interval.

16. A method for wireless communications at a user equipment (UE), comprising:
identifying, by the UE, a set of multiple modes of a plurality of modes in which at least one modem functional block of a plurality of modem functional blocks of a chipset of the UE operates for wireless communications during at least a portion of a time interval, each mode of the set of multiple modes comprising a combination of a wireless communications type and an action performed by the UE while operating in the wireless communications type one or more operations corresponding to a radio access technology, each of the one or more operations corresponding to a power response trend, and each respective modem functional block of the plurality of modem functional blocks comprising a plurality of modem units components of the chipset classified to have a power response that satisfies a power response trend metric for at least one mode of the set of multiple modes; selecting, by the UE from a lookup table, a set of multiple pre-configured power estimate calculation equations of a plurality of pre-configured power estimate calculation equations based at least in part on the set of multiple modes, each pre-configured power estimate calculation equation of the selected set being formed in accordance with a combination of a respective modem functional block of the plurality of modem functional blocks and a respective mode of the set of multiple modes, wherein each entry of the lookup table indicates a respective pre-configured power estimation calculation equation of the plurality of pre-configured power estimate calculation equations and corresponds to one of the respective combinations of the respective modem functional blocks of the plurality of modem functional blocks and the respective modes of the set of multiple modes;
calculating, by the UE, an estimated power consumption level for the chipset for the time interval based at least in part on the set of multiple pre-configured power estimate calculation equations and a proportion of the time interval a respective modem functional block of the plurality of modem functional blocks operates in a respective mode of the set of multiple modes, and based at least in part on a weighted average of a plurality of estimated subpower consumption levels calculated for each respective modem functional block of the plurality of modem functional blocks that operated in the set of multiple modes during the time interval, wherein each estimated subpower consumption level is associated with a given weight for the weighted average; and
controlling operation of at least one component of the UE based at least in part on the estimated power consumption level.

17. The method of claim 16, further comprising:
identifying one or more modem functional blocks of the plurality of modem functional blocks of the chipset that operates during at least the portion of the time interval.

18. A non-transitory computer-readable medium storing code for wireless communications at a user equipment (UE), the code comprising instructions executable by a processor to:
identify, by the UE, a set of multiple modes of a plurality of modes in which at least one modem functional block of a plurality of modem functional blocks of a chipset of the UE operates for wireless communications during at least a portion of a time interval, each mode of the set of multiple modes comprising a combination of a wireless communications type and an action performed by the UE while operating in the wireless communications type one or more operations corresponding to a radio access technology, each of the one or more operations corresponding to a power response trend, and each respective modem functional block of the plurality of modem functional blocks comprising a plurality of modem units components of the chipset classified to have a power response that satisfies a power response trend metric for at least one mode of the set of multiple modes;

select, by the UE from a lookup table, a set of multiple pre-configured power estimate calculation equations of a plurality of pre-configured power estimate calculation equations based at least in part on the set of multiple modes, each pre-configured power estimate calculation equation of the selected set being formed in accordance with a combination of a respective modem functional block of the plurality of modem functional blocks and a respective mode of the set of multiple modes, wherein each entry of the lookup table indicates a respective pre-configured power estimation calculation equation of the plurality of pre-configured power estimate calculation equations and corresponds to one of the respective combinations of the respective modem functional blocks of the plurality of modem functional blocks and the respective modes of the set of multiple modes;

calculate, by the UE, an estimated power consumption level for the chipset for the time interval based at least in part on the set of multiple pre-configured power estimate calculation equations and a proportion of the time interval a respective modem functional block of the plurality of modem functional blocks operates in a respective mode of the set of multiple modes, and based at least in part on a weighted average of a plurality of estimated subpower consumption levels calculated for each respective modem functional block of the plurality of modem functional blocks that operated in the set of multiple modes during the time interval, wherein each estimated subpower consumption level is associated with a given weight for the weighted average; and control operation of at least one component of the UE based at least in part on the estimated power consumption level.

19. The UE of claim 1, wherein the plurality of modem functional blocks of the chipset of the UE comprises:

a first modem functional block comprising a system on chip unit, a dynamic random access memory unit, and a power management integrated circuit unit of the chipset, a second modem functional block comprising a modem unit, a third modem functional block comprising an interconnect of the chipset, a fourth modem functional block comprising a digital component of the chipset, and a fifth modem functional block comprising at least one amplifier of the chipset.

20. The UE of claim 1, wherein the power response trend metric comprises at least one of a linear power response, a quadratic power response, a polynomial power response, and a power response determined via interpolation as a value of at least one input parameter type changes.

21. The UE of claim 1, wherein the instructions to calculate the estimated power consumption level are further executable by the one or more processors to cause the UE to:

configure a histogram of input parameters and the set of multiple modes for each functional block of the plurality of modem functional blocks; and evaluate the histogram to determine the set of multiple pre-configured power estimate calculation equations and calculate a total estimated power per functional block, where the total estimated power is a weighted average of the set of multiple modes and the input parameters in the histogram.

22. The UE of claim 1, wherein the set of multiple modes comprises one or more of a sleep mode, a partial sleep mode, a talk mode, a data mode, or a control channel mode.

* * * * *